(12) United States Patent
Tang et al.

(10) Patent No.: US 11,469,501 B2
(45) Date of Patent: Oct. 11, 2022

(54) BEAM STEERABLE ANTENNA SYSTEM, METHOD OF MANUFACTURING THEREOF AND METHOD OF BEAM STEERING AN ANTENNA ARRAY

(71) Applicant: Agency for Science, Technology and Research, Singapore (SG)

(72) Inventors: Xinyi Tang, Singapore (SG); Francois Po Shin Chin, Singapore (SG); Xiaoming Peng, Singapore (SG); Xianming Qing, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 17/042,317

(22) PCT Filed: Mar. 29, 2019

(86) PCT No.: PCT/SG2019/050188
§ 371 (c)(1),
(2) Date: Sep. 28, 2020

(87) PCT Pub. No.: WO2019/190412
PCT Pub. Date: Oct. 3, 2019

(65) Prior Publication Data
US 2021/0021033 A1 Jan. 21, 2021

(30) Foreign Application Priority Data
Mar. 29, 2018 (SG) .......................... 10201802654Q

(51) Int. Cl.
*H01Q 3/00* (2006.01)
*H01Q 3/42* (2006.01)
(Continued)

(52) U.S. Cl.
CPC ............... *H01Q 3/42* (2013.01); *H01Q 3/28* (2013.01); *H01Q 3/38* (2013.01); *H01Q 3/26* (2013.01); *H01Q 3/30* (2013.01); *H01Q 3/36* (2013.01)

(58) Field of Classification Search
CPC .. H01Q 3/42; H01Q 3/28; H01Q 3/38; H01Q 3/26; H01Q 3/30; H01Q 3/36
(Continued)

(56) References Cited

U.S. PATENT DOCUMENTS 4,189,733 A * 2/1980 Malm .................. H01Q 3/2617
342/368
5,079,557 A * 1/1992 Hopwood .......... H01Q 21/0025
342/372
(Continued)

FOREIGN PATENT DOCUMENTS

| CN | 103476043 A | 12/2013 |
|---|---|---|
| JP | 2002076748 A | 3/2002 |
| WO | 2017218396 A1 | 12/2017 |

OTHER PUBLICATIONS

International Search Report for International Application No. PCT/SG2019/050188 dated Jun. 7, 2019, pp. 1-4.
(Continued)

*Primary Examiner* — Chuong P Nguyen
(74) *Attorney, Agent, or Firm* — Shackelford, Bowen, McKinley & Norton, LLP

(57) ABSTRACT

There is provided a beam steerable antenna system including: an antenna array including a plurality of first radiating elements; a first phase control section coupled to the plurality of first radiating elements, the first phase control section being configured to control a phase of signals from the plurality of first radiating elements to output first phase controlled signals; a first combiner coupled to the first phase control section, the first combiner being configured to com-
(Continued)

bine the first phase controlled signals to output a first combined signal; a first frequency converter coupled to the first combiner, the first frequency converter being configured to downconvert a frequency of the first combined signal to output a first downconverted signal; and a second phase control section coupled to the first frequency converter, the second phase control section being configured to control a phase of the first downconverted signal to output a second phase controlled signal. There is also provided a method of manufacturing the beam steerable antenna system, and a method of beam steering an antenna array.

18 Claims, 14 Drawing Sheets

(51) Int. Cl.
  *H01Q 3/28* (2006.01)
  *H01Q 3/38* (2006.01)
  *H01Q 3/26* (2006.01)
  *H01Q 3/30* (2006.01)
  *H01Q 3/36* (2006.01)

(58) Field of Classification Search
  USPC .................................................. 342/372, 368
  See application file for complete search history.

(56) References Cited

U.S. PATENT DOCUMENTS

| | | | | |
|---|---|---|---|---|
| 5,977,910 | A * | 11/1999 | Matthews | H01Q 3/26 342/368 |
| 6,400,318 | B1 * | 6/2002 | Kasami | H01Q 3/2605 342/372 |
| 6,690,326 | B2 * | 2/2004 | Nemit | H01Q 3/26 342/372 |
| 6,906,665 | B1 * | 6/2005 | Lam | H01Q 3/26 342/368 |
| 10,069,547 | B2 * | 9/2018 | Wang | H04B 7/0617 |
| 10,141,993 | B2 * | 11/2018 | Lee | H04B 7/0408 |
| 10,897,082 | B1 * | 1/2021 | Legare | H01Q 3/40 |
| 11,095,350 | B1 * | 8/2021 | Montalvo | H04B 7/0617 |
| 11,108,458 | B2 * | 8/2021 | Lee | H04L 25/0204 |
| 2010/0117913 | A1 * | 5/2010 | Jung | H01Q 1/246 343/724 |
| 2016/0353294 | A1 | 12/2016 | Wang et al. | |
| 2017/0366242 | A1 * | 12/2017 | Lee | H04B 7/0408 |
| 2019/0326664 | A1 * | 10/2019 | Zhu | H01Q 3/38 |
| 2020/0335866 | A1 * | 10/2020 | Wang | H01Q 3/34 |

OTHER PUBLICATIONS

Written Opinion of the International Searching Authority for International Application No. PCT/SG2019/050188 dated Jun. 7, 2019, pp. 1-5.

* cited by examiner

BEAM STEERABLE ANTENNA SYSTEM, METHOD OF MANUFACTURING THEREOF AND METHOD OF BEAM STEERING AN ANTENNA ARRAY

CROSS-REFERENCE TO RELATED APPLICATION

This application claims the benefit of priority of Singapore Patent Application No. 10201802654Q, filed on 29 Mar. 2018, the content of which being hereby incorporated by reference in its entirety for all purposes.

TECHNICAL FIELD

The present invention generally relates to a beam steerable antenna system and associated/related methods, including a method of manufacturing a beam steerable antenna system and a method of beam steering an antenna array.

BACKGROUND

The available spectrum at mmWave (30 GHz to 300 GHz) covers various applications, such as satellite, 5G, high speed wireless backhaul, imaging, sensing and automotive radars. When the operating frequency goes higher, highly directive radiation beams can be obtained using a physically small antenna aperture. To ensure a high quality and reliable link, one of the key enabling technologies is the electronic beam steering technique which can quickly steer the antenna beam to a desired or best possible channel. Furthermore, beam steering antennas can enhance the signal-to-noise ratio (SNR) and eliminate or mitigate interferences. For example, it may be desirable for generated beams to produce a flat coverage within a range of interest. It may also be desirable for the scan resolution to be less than the 3-dB beamwidth of the generated beam to maintain a scan flatness of 3 dB.

As an example illustration, FIG. 1 shows the 1-dB, 2-dB and 3-dB beamwidths of different array sizes with an element spacing of $0.5\lambda$. For example, for a 64-element linear array (physical size of 32 cm for 30 GHz), the required scan resolution may be around 1° to produce 1-dB scanning flatness. In this regard, a high phase shift resolution may be needed to achieve such a high beam scanning resolution. The phase shift may be implemented at radio frequency (RF) chain, local oscillator (LO) chain, intermediate frequency (IF) chain or baseband (BB). Compared to high frequency (e.g., at RF or LO), it may be easier to implement a high resolution phase shifter at much lower frequencies (e.g., at IF or BB). For example, a conventional high resolution phase shifter above 24 GHz ranging from 3-bit to 5-bit depending on the frequency has been previously reported. One way to phase control (using phase shifter(s)) at IF frequency may be to bring the frequency down (e.g., from RF to IF) using a frequency mixer. However, such an approach would in turn require a large number of frequency mixers (e.g., one frequency mixer per channel), which may undesirably result in an increase in the size of the conventional beam steerable antenna system.

A need therefore exists to provide a beam steerable antenna system and associated/related methods that seek to overcome, or at least ameliorate, one or more deficiencies associated with conventional beam steering antenna systems and methods, such as but not limited to, improving beam steering resolution (e.g., enabling a high beam steering resolution) and/or simplifying calibration in antenna architecture (e.g., modular subarray architecture based beam steering antenna systems) in an efficient, effective and/or practical manner.

SUMMARY

According to a first aspect of the present invention, there is provided a beam steerable antenna system comprising:
an antenna array comprising a plurality of first radiating elements;
a first phase control section coupled to the plurality of first radiating elements, the first phase control section being configured to control a phase of signals from the plurality of first radiating elements to output first phase controlled signals;
a first combiner coupled to the first phase control section, the first combiner being configured to combine the first phase controlled signals to output a first combined signal;
a first frequency converter coupled to the first combiner, the first frequency converter being configured to downconvert a frequency of the first combined signal to output a first downconverted signal; and
a second phase control section coupled to the first frequency converter, the second phase control section being configured to control a phase of the first downconverted signal to output a second phase controlled signal.

According to a second aspect of the present invention, there is provided a method of manufacturing a beam steerable antenna system, the method comprising:
forming an antenna array comprising a plurality of first radiating elements;
coupling a first phase control section to the plurality of first radiating elements, the first phase control section being configured to control a phase of signals from the plurality of first radiating elements to output first phase controlled signals;
coupling a first combiner to the first phase control section, the first combiner being configured to combine the first phase controlled signals to output a first combined signal;
coupling a first frequency converter to the first combiner, the first frequency converter being configured to downconvert a frequency of the first combined signal to output a first downconverted signal; and
coupling a second phase control section to the first frequency converter, the second phase control section being configured to control a phase of the first downconverted signal to output a second phase controlled signal.

According to a third aspect of the present invention, there is provided a method of beam steering an antenna array comprising a plurality of first radiating elements, the method comprising:
controlling, at a first phase control section coupled to the plurality of first radiating elements, a phase of signals from the plurality of first radiating elements to output first phase controlled signals;
combining, at a first combiner coupled to the first phase control section, the first phase controlled signals to output a first combined signal;
downconverting, at a first frequency converter coupled to the first combiner, a frequency of the first combined signal to output a first downconverted signal; and
controlling, at a second phase control section coupled to the first frequency converter, a phase of the first downconverted signal to output a second phase controlled signal.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a beam steerable antenna system and associated/related methods, including a method of manufacturing a beam steerable antenna system and a beam steering method. As described in the background, a high beam steering (or scanning) resolution may be desired or required for various applications, however, various conventional beam steering antenna systems and methods do not provide an efficient, effective and/or practical technical solution. By way of examples only and to highlight various drawbacks/deficiencies associated with various conventional beam steering antenna systems, various conventional beam steering antenna systems will now be briefly or generally described below with reference to FIGS. 2 to 5.

Figure 1:
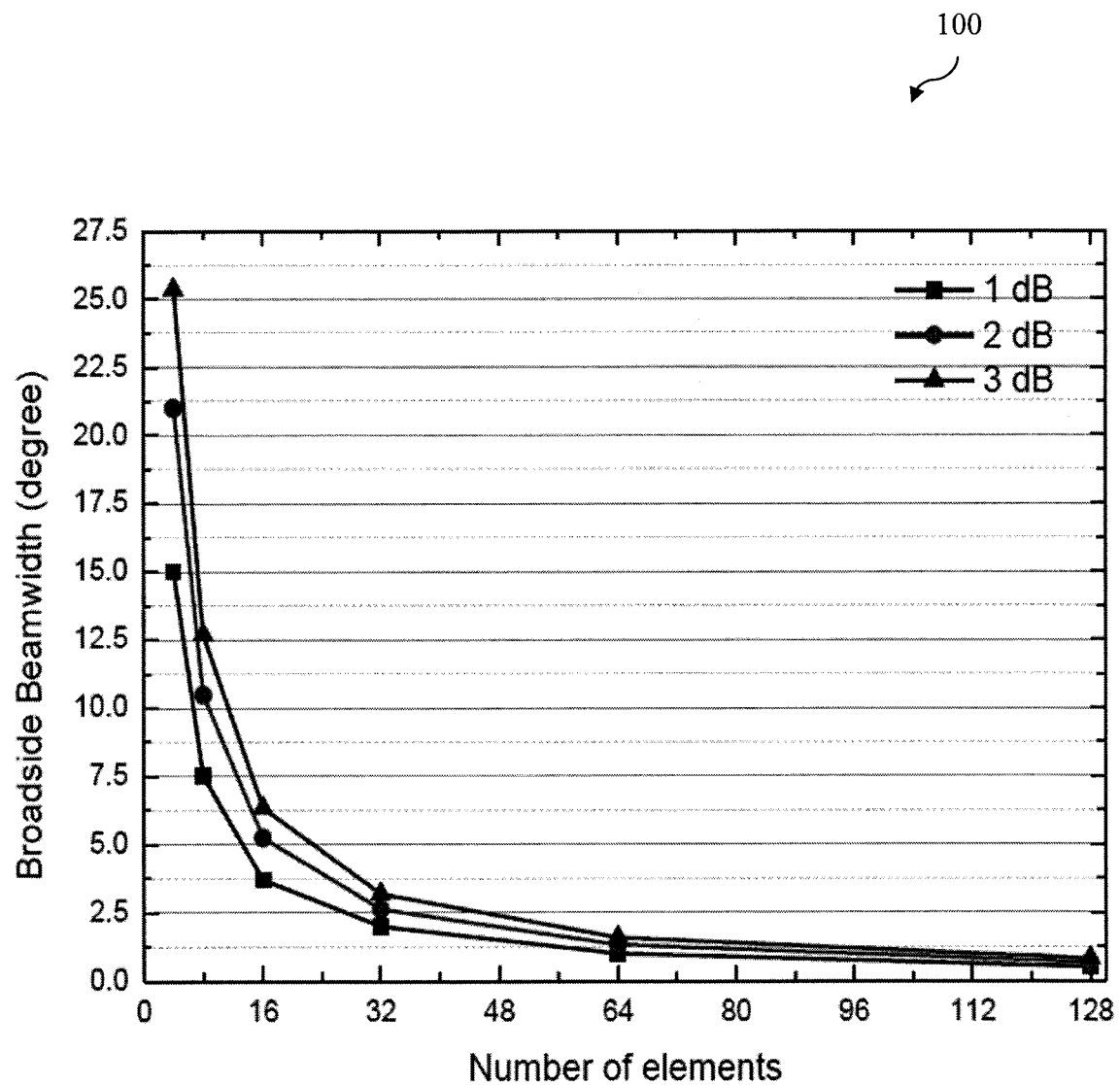
FIG. 1 shows 1-dB, 2-dB and 3-dB beamwidths of different array sizes with an element spacing of 0.5λ.
Figure 2:
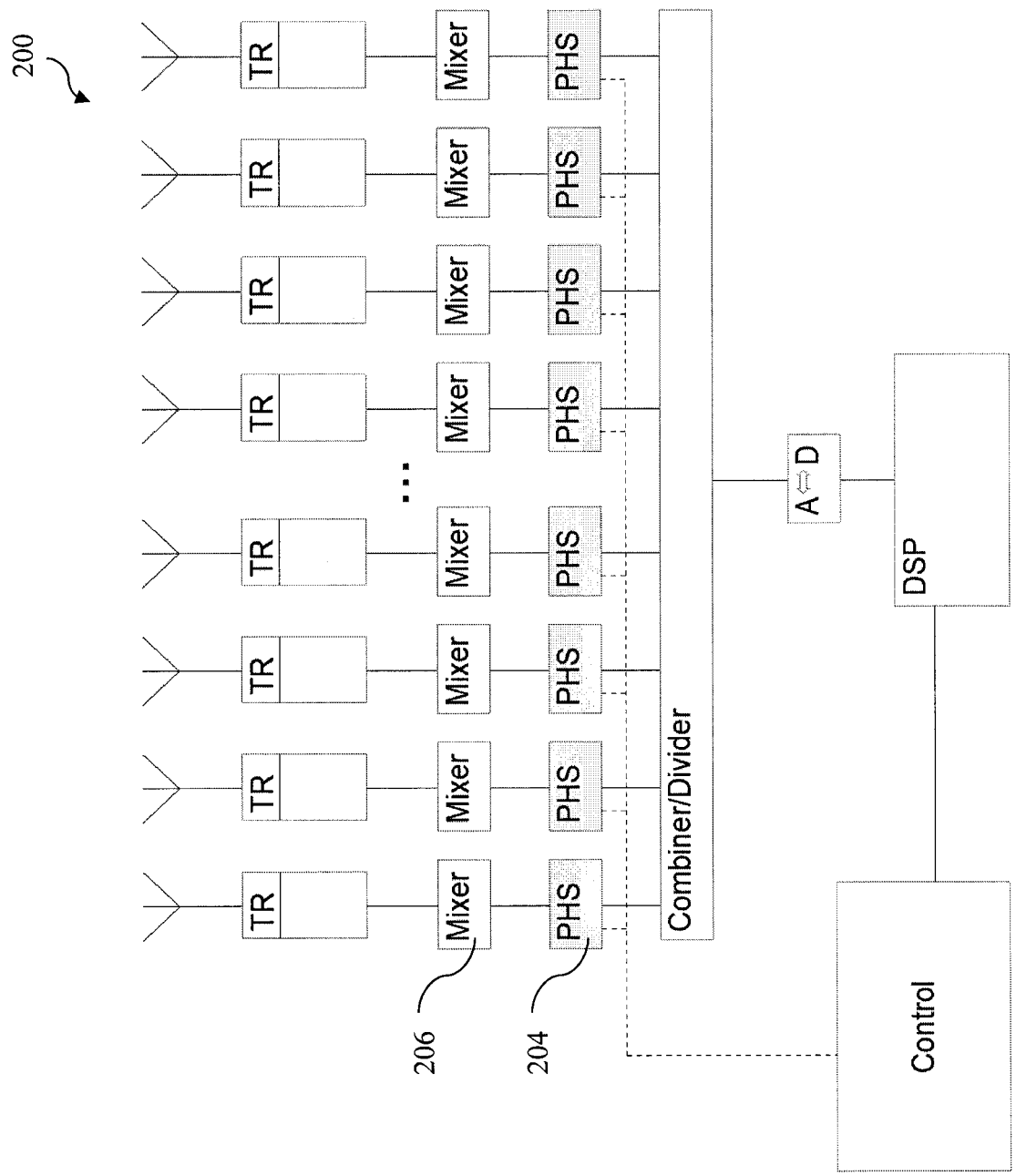
FIG. 2 depicts a schematic drawing of an example conventional beam steering antenna system with element level intermediate frequency (IF) beam steering.

FIG. 2 depicts a schematic drawing of an example conventional beam steering antenna system 200 with element level intermediate frequency (IF) beam steering. As shown in FIG. 2, the example conventional system 200 has a single-stage phase control with one high resolution phase shifter (PHS) 204 adapted to each channel after the corresponding frequency mixer 206. In the example conventional system 200, as can be seen from FIG. 2, the frequency mixers are not shared amongst multiple channels.

Figure 3:
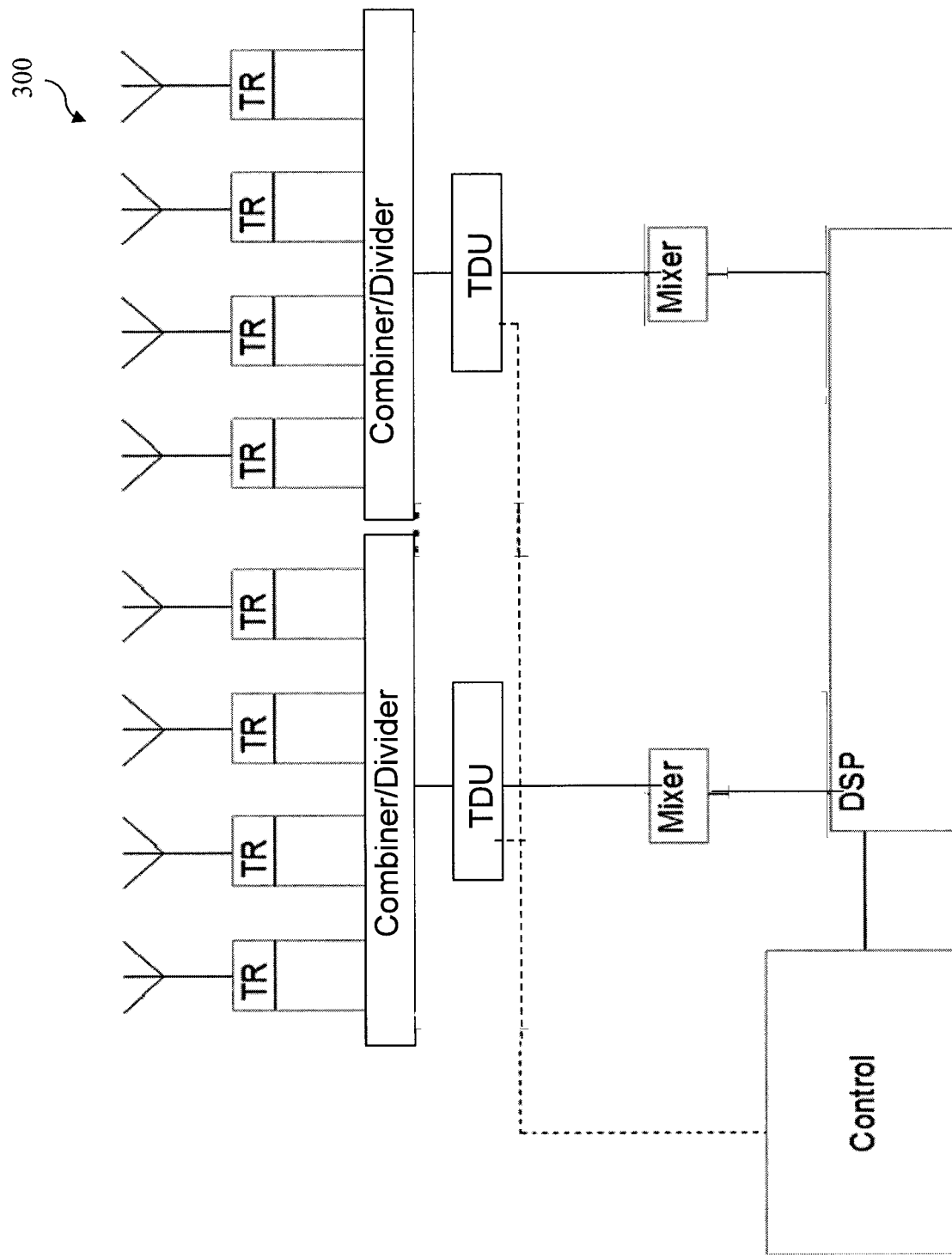
FIG. 3 depicts a schematic drawing of an example conventional beam steering antenna system with subarray level time delay.

FIG. 3 depicts a schematic drawing of an example conventional beam steering antenna system 300 with subarray level time delay (a one stage RF TDU in subarray level). As shown in FIG. 3, the example conventional system 300 has a time control at high frequency.

Figure 4:
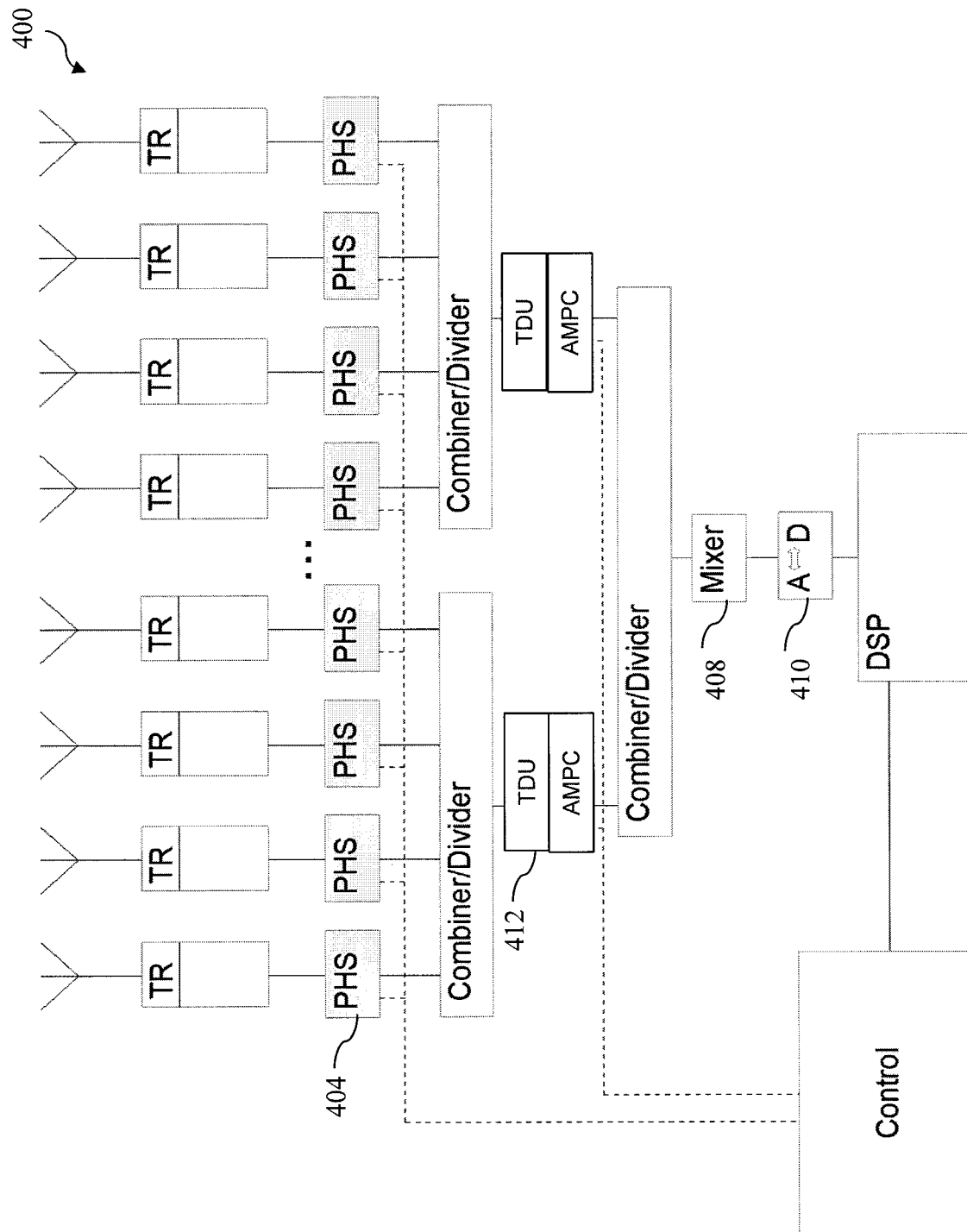
FIG. 4 depicts a schematic drawing of an example conventional beam steering antenna system with subarray level amplitude control (AMPC)

FIG. 4 depicts a schematic drawing of an example conventional beam steering antenna system 400 with subarray level amplitude control (AMPC). As shown in FIG. 4, the example conventional system 400 has a two-stage phase and time control at the RF stage (RF frequencies), and then followed by a shared frequency mixer 408 and an analog-to-digital converter (ADC) 410. In addition, the element level RF phase shifter 404 may be adapted and subarray level amplitude control may be applied to minimize side lobe level when the beam is steered. However, such a large RF level distribution network after the TDU 412 may be undesirable.

Figure 5:
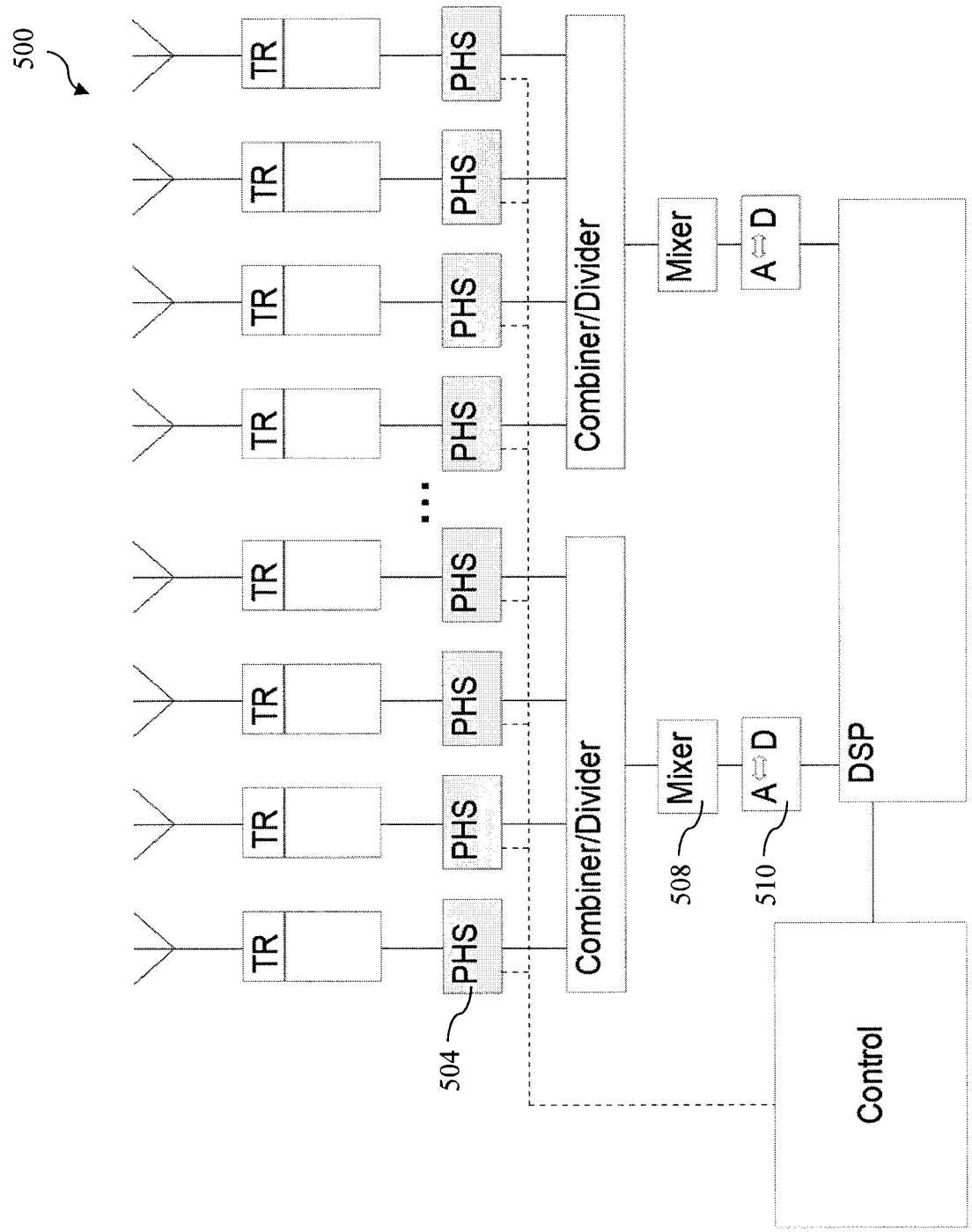
FIG. 5 depicts a schematic drawing of an example conventional beam steering antenna system with subarray level RF analog phase shift.

FIG. 5 depicts a schematic drawing of an example conventional beam steering antenna system 500 with subarray level RF analog phase shift and ADC. As shown in FIG. 5, the example conventional system 500 has a two-stage control, namely, a RF phase shifter 504 at the first stage, and the phase control at baseband after an ADC 510 in subarray level. In this example conventional system 500, multiple ADCs 510 and frequency mixers 508 are required.

The above-mentioned conventional beam steering antenna systems have been found to suffer from various limitations/deficiencies when adapted for practical mmWave or even higher frequency applications.

For example, in relation to the example conventional beam steering antenna system 200 as shown in FIG. 2, one frequency mixer 206 and one IF phase shifter 204 are adopted at each channel. The IF phase shifter 204 may produce a high resolution phase shift, however, since the operation frequency is brought lower, the physical size of the phase shifter becomes larger and thus it may be difficult to accommodate the IF phase shifters within the small antenna array size and spacing required for mmWave applications. For example, this may be because when aiming at integrated solution, the complete circuit must be squeezed between the mmWave antennas, however the phase shifter is designed in a much lower IF frequencies where inductors and capacitors are both large.

For example, in relation to the example conventional beam steering antenna system 300 as shown in FIG. 3, TDUs are used at subarray level. In this regard, conventional TDUs have design tradeoffs, such as device loss, minimum time delay step and maximum delay range. For example, to apply TDUs in a large array with high resolution, it may be necessary to compensate for the associated device loss and such a compensation reduces the system power efficiency.

For example, in relation to the example conventional beam steering antenna system 400 as shown in FIG. 4, the RF phase shifter 404 is adopted at element level and the AMPC is adapted at subarray level. Accordingly, beam steering is mainly achieved by the element level RF phase shifter 404 and the subarray level AMPC provides certain side lobe suppression near the main beam. For example, compared to FIG. 3, this architecture is able to steer the beam within the subarray since each element is connected with a coarse phase shifter, however, there is still one TDU in subarray level, and the design tradeoff of the TDU mentioned with reference to FIG. 3 remains.

For example, in relation to the example conventional beam steering antenna system 500 as shown in FIG. 5, digital beamforming (DBF) is used at subarray level together with RF level phase shifter 504. For example, this means that DBF is not applied to each of the element to reduce the number of mixers and ADCs. However, the number of ADC/DAC at subarray level still increases the total power consumption. For example, it may be desirable to reduce the number of ADC/DAC due to its high power consumption. For very large size array, since the produced beam is very narrow, the required resolution is thus very high and the phase control should be with small steps. In this regard, full DBF may be able to achieve it but it requires an ADC/DAC for each element.

Various embodiments of the present invention provide a beam steerable antenna system and associated/related methods that seek to overcome, or at least ameliorate, one or more deficiencies associated with conventional beam steering antenna systems and methods, such as but not limited to, improving beam steering resolution (e.g., enabling a high beam steering resolution) in an efficient, effective and/or practical manner Various embodiments also simplify calibration in modular subarray architecture based beam steering antenna systems.

Figure 6:
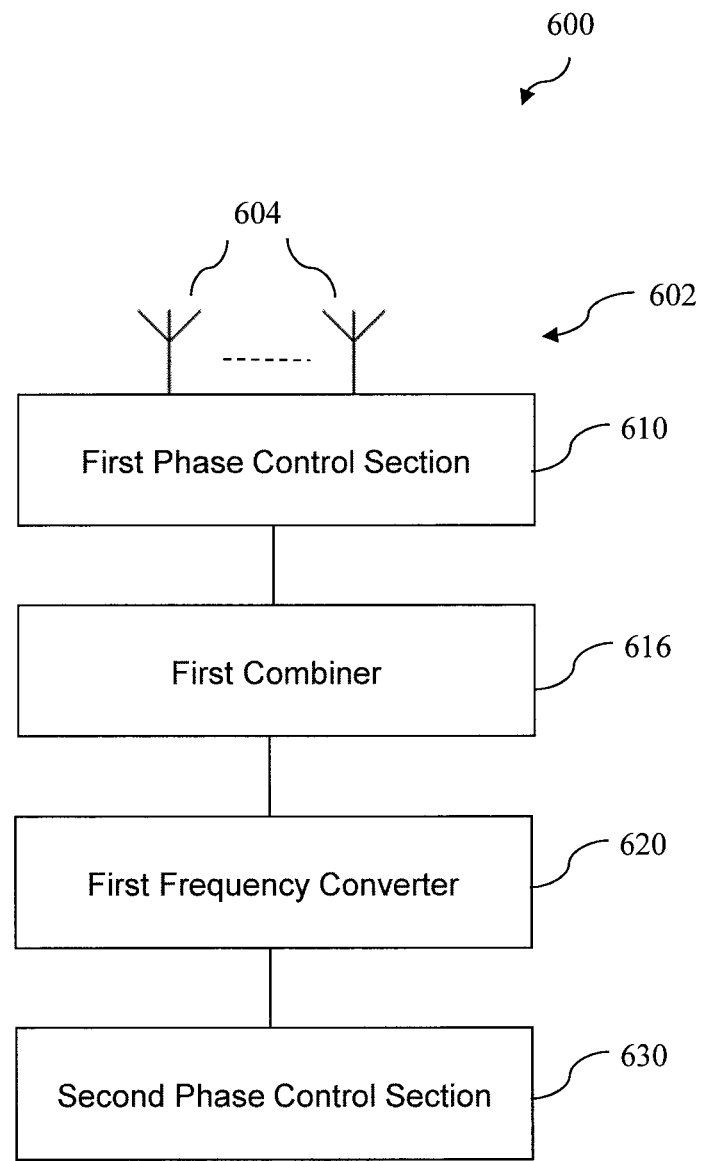
FIG. 6 depicts a schematic drawing of a beam steerable antenna system, according to various embodiments of the present invention.

FIG. 6 depicts a schematic drawing of a beam steerable antenna system 600 (which may also be interchangeably referred to herein as "beam steering antenna system") according to various embodiments of the present invention. The system 600 comprises an antenna array 602 comprising a plurality of first radiating elements 604; a first phase control section 610 coupled to the plurality of first radiating elements 604, the first phase control section 610 being configured to control a phase of signals from the plurality of first radiating elements 604 to output first phase controlled signals; a first combiner 616 coupled to the first phase control section 610, the first combiner 616 being configured to combine the first phase controlled signals to output a first combined signal; a first frequency converter 620 coupled to the first combiner 616, the first frequency converter 620 being configured to downconvert a frequency of the first combined signal to output a first downconverted signal; and a second phase control section 630 coupled to the first frequency converter 620, the second phase control section 630 being configured to control a phase of the first downconverted signal to output a second phase controlled signal.

Accordingly, various embodiments of the present invention provide a beam steerable antenna system having a multi-stage phase control at different frequency domains (e.g., different frequency stages or chains), which has been found to advantageously improve beam steering resolution (e.g., enable a high beam steering resolution) in an efficient, effective and/or practical manner. For example, a first stage phase control at a higher frequency domain (e.g., RF) may be configured to provide course phase control and a second stage at lower frequency domain (e.g., IF) may be configured to provide fine phase control. For example, in the beam steerable antenna system 600 according to various embodiments as shown in FIG. 6, a first phase control section 610 is provided at a first frequency domain and is configured to control a phase of first signal(s) inputted thereto, and furthermore, a second phase control section 630 is provided at a second frequency domain and is configured to control a phase of second signal(s) (derived from the first signal(s)) inputted thereto. In this regard, the first and second frequency domains are different, and in various embodiments, the second frequency domain is lower than the first frequency domain. As a result, for example, the number of power hungry analog/digital converter (i.e., analog-to-digital converter (ADC) or digital-to-analog converter (DAC)) can be advantageously reduced or minimized, such as by using low power consumption phase shifter instead.

In various embodiments, the beam steerable antenna system 600 has a two-stage phase control corresponding to (or realized based on) the first phase control section 610 and the second phase control section 630.

In various embodiments, the first phase control section 610 comprises a plurality of first phase shifters. In various embodiments, the number of first phase shifters corresponds to (is the same as) the number of first radiating elements 602. In other words, one first phase shifter may be provided for each first radiating element 602 at a corresponding channel.

In various embodiments, signals from the plurality of first radiating elements 602 may be radio frequency (RF) signals. In various embodiments, the first phase control section 610 may be arranged at a RF domain (e.g., RF stage) of the beam steerable antenna system 600. Accordingly, in various embodiments, the first phase control section 610 may be referred to as a low resolution phase control section 610, and thus, each first phase shifter may be referred to as a low resolution phase shifter.

In various embodiments, each of the plurality of first phase shifters is coupled to a respective radiating element of the plurality of first radiating elements at an input portion thereof (e.g., for receiving the RF signals from the corresponding first radiating element) and is coupled to the first combiner 616 at an output portion thereof (e.g., for outputting the first phase controlled signals to the first combiner 616).

In various embodiments, the first combiner 616 is coupled to the first phase control section 610 at an input portion thereof (e.g., for receiving the first phase controlled signals from the first phase control section 610) and is coupled to the first frequency converter 620 at an output portion thereof (e.g., for outputting the first combined signal to the first frequency converter 620).

In various embodiments, the first frequency converter 620 is coupled to the first combiner 616 at an input portion thereof (e.g., for receiving the first combined signal from the first combiner 616) and is coupled to the second phase control section 630 at an output portion thereof (e.g., for outputting the first downconverted signal to the second phase control section 630).

In various embodiments, the second phase control section 630 is coupled to the first frequency converter 620 at an input portion thereof (e.g., for receiving the first downconverted signal from the first frequency converter 620).

In various embodiments, the second phase control section 630 comprises a second phase shifter. Accordingly, the second phase shifter may be coupled to the first frequency converter 620 at an input portion thereof.

In various embodiments, the second phase control section 630 may be arranged at an intermediate frequency (IF) domain (e.g., IF stage) of the beam steerable antenna system 600. Accordingly, in various embodiments, the second phase control section 630 may be referred to as a high resolution phase control section 630, and thus, the second phase shifter may be referred to as a high resolution phase shifter.

In various embodiments, the first frequency converter 620 may thus be configured to downconvert a signal received (inputted thereto) from RF to IF.

In various embodiments, the second phase shifter is a broadband phase shifter configured to generate a variable phase shift (or non-constant phase shift). In various example embodiments, depends broadband phase shifter may be configured/provided depending on the RF frequency and/or the IF frequency chosen For example, a 2 GHz bandwidth at 30 GHz may be provided but if the IF is chosen as 3 GHz, then 2 GHz/3 GHz may be considered very broadband in terms of relative bandwidth.

In various embodiments, the broadband phase shifter comprises a first branch and a second branch connected at input ends thereof and at output ends thereof. The first branch comprises a first component configured to generate a first phase shift with a first slope profile and the second branch comprises a second component configured to generate a second phase shift with a second slope profile. In particular, the first slope profile and the second slope profile are different. Accordingly, with the different slope profiles, a variable phase shift may be generated by the broadband phase shifter, which has been found to be advantageous in addressing (e.g., mitigates or minimizes) the squint effect.

Figure 7:
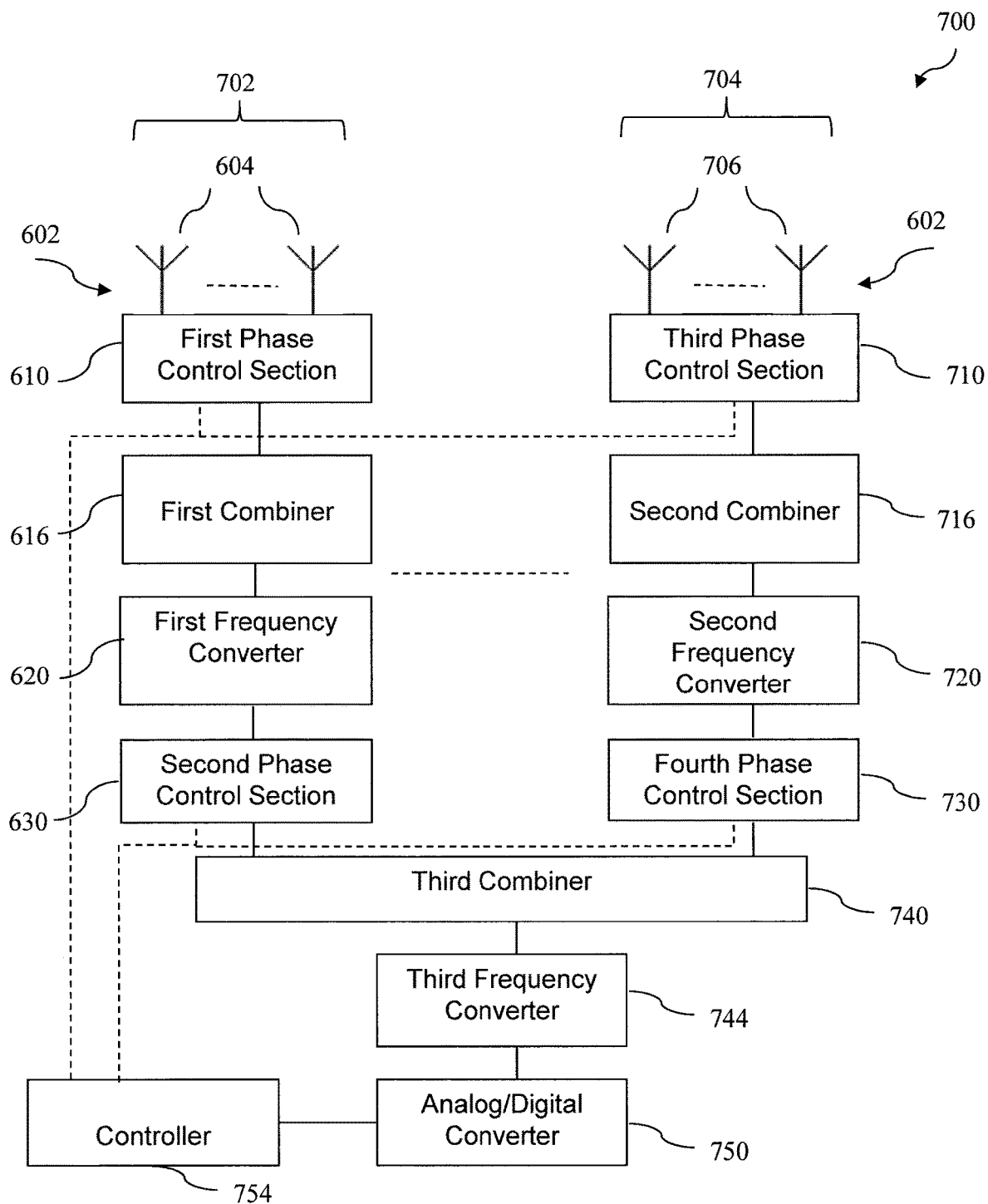
FIG. 7 depicts a schematic drawing of a beam steerable antenna system including an antenna array configured into the plurality of antenna subarrays, according to various embodiments of the present invention.

In various embodiments, the antenna array 602 is configured into a plurality of antenna subarrays. FIG. 7 depicts a schematic drawing of a beam steerable antenna system 700 comprising an antenna array 602 configured into the plurality of antenna subarrays according to various embodiments of the present invention. In the beam steerable antenna system 700, a first antenna subarray 702 of the plurality of antenna subarrays comprises the plurality of first radiating elements 604, such as described hereinbefore according to various embodiments with reference to FIG. 6, and each remaining antenna subarray 704 of the plurality of antenna subarrays comprises a plurality of second radiating elements 706. In this regard, the beam steerable antenna system 700 further comprises, for (or with respect to) the first antenna subarray 702, the first phase control section 610, the first combiner 616, the first frequency converter 620 and the second phase control section 630 as described hereinbefore according to various embodiments with reference to FIG. 6, and thus need not be repeated for conciseness and clarity. In addition, the beam steerable antenna system 700 further comprises, for (or with respect to) the above-mentioned each remaining antenna subarray 704: a third phase control section 710 coupled to the remaining antenna subarray 704, the third phase control section 710 being configured to control a phase of signals from the plurality of second radiating elements 706 of the remaining antenna subarray 704 to output third phase controlled signals; a second combiner 716 coupled to the third phase control section 710, the second combiner 716 being configured to combine the third phase controlled signals to output a second combined signal; a second frequency converter 720 coupled to the second combiner 716, the second frequency converter 720 being configured to downconvert a frequency of the second combined signal to output a second downconverted signal; and a fourth phase control section 730 coupled to the second frequency converter 720, the fourth phase control section 730 being configured to control a phase of the second downconverted signal to output a fourth phase controlled signal.

In various embodiments, the third phase control section 710, the second combiner 716, the second frequency converter 720 and the fourth phase control section are configured to operate or function in the same or similar manner as the first phase control section 610, the first combiner 616, the first frequency converter 620 and the second phase control section 630, as described hereinbefore according to various embodiments with reference to FIG. 6, and thus need to be repeated for conciseness and clarity.

In various embodiments, the beam steerable antenna system 700 further comprises a third combiner 740 and a third frequency converter 744. The third combiner 740 is coupled to the second phase control section 630 associated with the first antenna subarray 702 and the fourth phase control section 730 associated with the above-mentioned each remaining antenna subarray 706 (i.e., coupled to the second phase control section 630 and each fourth phase control section 730). The third combiner 740 is configured to combine the second phase controlled signal output from the second phase control section 630 associated with the first antenna subarray 702 and the fourth phase controlled signal output from the fourth phase control section 730 associated with the above-mentioned each remaining antenna subarray 704 (i.e., combine the second phase controlled signal and each fourth phase controlled signal) to output a third combined signal. The third frequency converter 744 is coupled to the third combiner 740, and is configured to downconvert a frequency of the third combined signal to output a third downconverted signal.

In various embodiments, the third combiner 740 is coupled to the second phase control section 630 and each fourth phase control section 730 at an input portion thereof (e.g., for receiving the second phase controlled signal and each fourth phase controlled signal) and is coupled to the third frequency converter 744 at an output portion thereof (e.g., for outputting the third combined signal to the third frequency converter 744).

In various embodiments, the beam steerable antenna system 700 further comprising an analog/digital converter 750 and a controller 754. The analog/digital converter 750 is coupled to the third frequency converter 744, and is configured to convert the third downconverted signal from an analog signal to a digital signal and output the digital signal (e.g., based on sampling).

In various embodiments, the analog/digital converter 750 is arranged at a baseband domain of the beam steerable antenna system 700. Accordingly, the third frequency converter 744 may thus be configured to downconvert a signal received (inputted thereto) from IF to baseband.

In various embodiments, the controller 754 is coupled to the first phase control section 610 and the second phase control section 630 associated with the first antenna subarray 702 and the third phase control section 710 and the fourth phase control section 730 associated with the above-mentioned each remaining antenna subarray (i.e., coupled to the first phase control section 610, the second phase control section 630, each third phase control section 710 and each fourth phase control section 730). The controller 754 is configured to control the first phase control section and the second phase control section associated with the first antenna subarray and the third phase control section and the fourth phase control section associated with the above-mentioned each remaining antenna subarray (e.g., via a control or feedback signal) based on the digital signal.

It will be appreciated to a person skilled in the art that, unless stated or context requires otherwise, when a component (including a section) or an element is described as being coupled (or connected) to another component or element, the component or element may be directly coupled (i.e., without any intermediate/intervening component or element therebetween) or indirectly coupled (i.e., with one or more intermediate/intervening components or elements therebetween) as appropriate or as desired. By way of an example, in relation to the first phase control section 610 being coupled to the plurality of first radiating elements 604 as described hereinbefore, it will be appreciated that the first phase control section 610 may be coupled to the plurality of first radiating elements 604 via or through one or more intermediate/intervening components or elements, such as a transmit/receive (TR) module. Furthermore, unless stated otherwise or context requires otherwise, "being coupled" refers to being communicatively and/or electrically coupled, such as for enabling signal communication or transfer.

In various embodiments, the phase shifter(s) of the first phase control section 610 and the third phase control section 710 described herein may be any conventional phase shifter(s) known in the art as appropriate or as desired, such as but not limited to, switched filter phase shifters, vector based phase shifters, and reflection type phase shifters.

In various embodiments, the phase shifter(s) of the second phase control section 630 and the fourth phase control section 730 described herein may be any conventional phase shifter(s) known in the art as appropriate or as desired, such as but not limited to, switched filter phase shifters, vector based phase shifters, and reflection type phase shifters. In various other embodiments, the phase shifter(s) of the second phase shifter (as well as the fourth phase control section 730) may be a broadband phase shifter configured to generate a variable phase shift (or non-constant phase shift) as described hereinbefore, which has been found to be advantageous in addressing (e.g., mitigates or minimizes) squint effect.

In various embodiments, a combiner may be any conventional power combiner known in the art as appropriate or as desired, such as but not limited to, Wilkinson power dividers. For example, the first combiner 616 and the second combiner 716 described herein may be a RF power combiner, and the third combiner 740 described herein may be an IF power combiner.

In various embodiments, a frequency converter may be any conventional frequency mixer known in the art as appropriate or as desired. For example, the first frequency converter 620 and the second frequency converter 720 described herein may be a frequency mixer configured to downconvert the frequency of a signal inputted thereto from RF to IF Similarly, the third frequency converter 744 may be a frequency mixer configured to downconvert the frequency of a signal inputted thereto from IF to baseband.

In various example embodiments, a high resolution may refer to IF band phase shift step of equal to or less than 22.5 degree. In various example embodiments, low resolution may refer to RF band phase shift step of equal to or larger than 11.25 degree.

Figure 8:
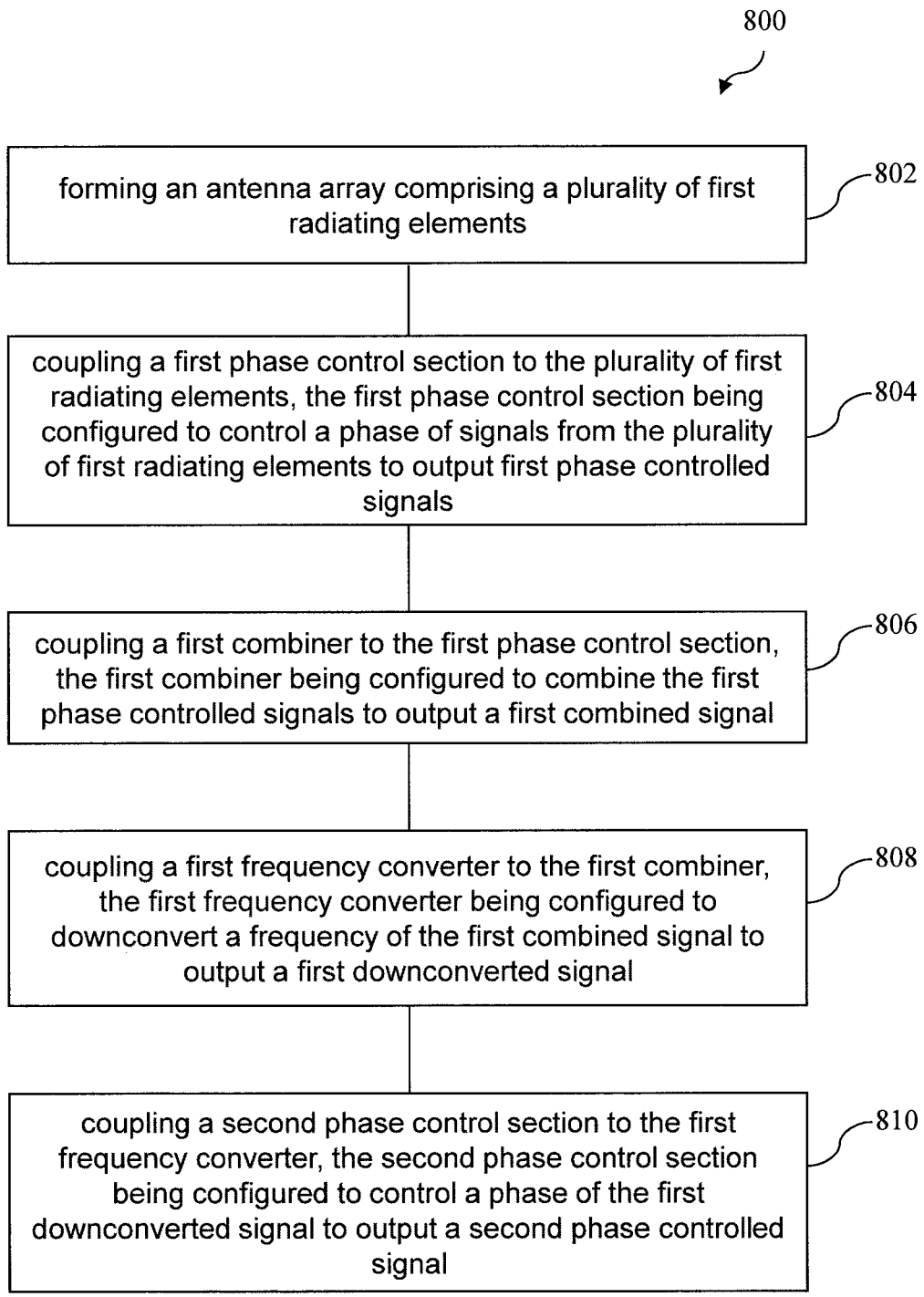
FIG. 8 depicts a schematic flow diagram illustrating a method of manufacturing a beam steerable antenna system, according to various embodiments of the present invention.

FIG. 8 depicts a schematic flow diagram illustrating a method 800 of manufacturing a beam steerable antenna system according to various embodiments of the present invention, such as the beam steerable antenna system 600 or 700 as described hereinbefore with reference to FIG. 6 or FIG. 7. The method 800 comprises forming (at 802) an antenna array comprising a plurality of first radiating elements; coupling (at 804) a first phase control section to the plurality of first radiating elements, the first phase control section being configured to control a phase of signals from the plurality of first radiating elements to output first phase controlled signals; coupling (at 806) a first combiner to the first phase control section, the first combiner being configured to combine the first phase controlled signals to output a first combined signal; coupling (at 808) a first frequency converter to the first combiner, the first frequency converter being configured to downconvert a frequency of the first combined signal to output a first downconverted signal; and coupling (at 810) a second phase control section to the first frequency converter, the second phase control section being configured to control a phase of the first downconverted signal to output a second phase controlled signal.

In various embodiments, the method 800 is for manufacturing the beam steerable antenna system 600 or 700 as described hereinbefore with reference to FIG. 6 or FIG. 7, therefore, various steps or operations of the method 800 may correspond to forming, providing or configuring various components or elements of the beam steerable system as described hereinbefore according to various embodiments, and thus such corresponding steps or operations need not be repeated with respect to the method 800 for clarity and conciseness. In other words, various embodiments described herein in context of the beam steerable antenna system 600 or 700 are analogously valid for the method 800 (e.g., for manufacturing the beam steerable antenna system having various components and configurations as described hereinbefore according to various embodiments), and vice versa.

For example, in relation to the antenna array 602 comprising a plurality of first radiating elements 604 as described hereinbefore with respect to the beam steerable antenna system 600 or 700, the method 800 for manufacturing the beam steerable antenna system 600 or 700 may thus comprise forming the antenna array comprising the plurality of first radiating elements. As another example, in relation to the first phase control section 610 as described hereinbefore with respect to the beam steerable antenna system 600 or 700, the method 800 may thus comprise coupling a first phase control section to the plurality of first radiating elements, the first phase control section being configured to control a phase of signals from the plurality of first radiating elements to output first phase controlled signals. As a further example, in relation to the feature of the first phase control section 610 comprising a plurality of first phase shifters and being arranged at a RF domain of the beam steerable antenna system as described hereinbefore with respect to the beam steerable antenna system 600 or 700, the method 800 may thus comprise coupling a first phase control section 610 comprising a plurality of first phase shifters to the plurality of first radiating elements, and arranging the first phase control section 610 at a RF domain of the beam steerable antenna system.

Figure 9:
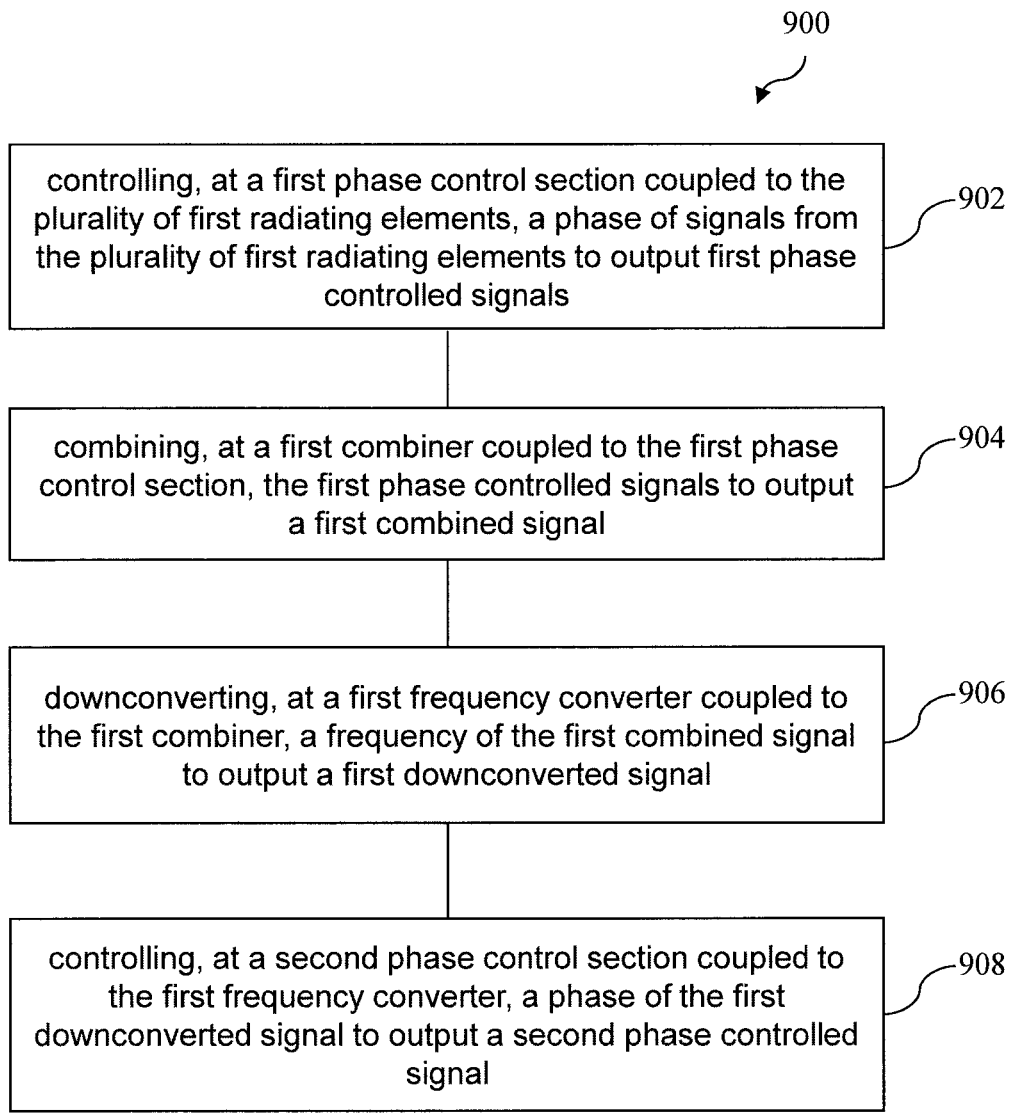
FIG. 9 depicts a schematic flow diagram illustrating a method of beam steering an antenna array including a plurality of first radiating elements, according to various embodiments of the present invention.

FIG. 9 depicts a schematic flow diagram illustrating a method 900 of beam steering an antenna array comprising a plurality of first radiating elements according to various embodiments of the present invention, such as the beam steerable antenna system 600 or 700 as described hereinbefore with reference to FIG. 6 or FIG. 7. The method 900 comprises: controlling (at 902), at a first phase control section coupled to the plurality of first radiating elements, a phase of signals from the plurality of first radiating elements to output first phase controlled signals; combining (at 904), at a first combiner coupled to the first phase control section, the first phase controlled signals to output a first combined signal; downconverting (at 906), at a first frequency converter coupled to the first combiner, a frequency of the first combined signal to output a first downconverted signal; and controlling (at 908), at a second phase control section coupled to the first frequency converter, a phase of the first downconverted signal to output a second phase controlled signal.

In various embodiments, similarly, the method 900 of beam steering corresponds to the beam steerable antenna system 600 or 700 as described hereinbefore with reference to FIG. 6 or FIG. 8, therefore, various steps or operations of the method 900 may correspond to various functions or operations in which various components (or elements) of the beam steerable antenna system 600 or 700 are configured to perform, as described hereinbefore according to various embodiments, and thus need not be repeated with respect to the method 900 for clarity and conciseness. In other words, various embodiments described herein in context of the beam steerable antenna system 600 or 700 are analogously valid for the method 900 of beam steering, and vice versa. For example, in relation to the first phase control section 610 as described hereinbefore with respect to the beam steerable antenna system 600 or 700, the method 900 may thus comprise controlling, at a first phase control section coupled to the plurality of first radiating elements, a phase of signals from the plurality of first radiating elements to output first phase controlled signals.

It will be understood by a person skilled in the art that various embodiments have been described herein from the perspective of a receiver (e.g., signal receiving process), and thus for a receiver, the frequency converter described hereinbefore (e.g., 620, 720, 744) may be a frequency downconverter, and the analog/digital converter described hereinbefore (e.g., 750) may thus be an analog-to-digital converter. However, it will be understood by a person skilled in the art that a transmitter (e.g., a signal transmitting process) may operate in an opposite manner (e.g., power dividing instead of power combining (or power divider instead of power combiner), frequency upconverting instead of frequency downconverting (or frequency upconverter instead of frequency downconverter), and digital-to-analog converting instead of analog-to-digital converting (or DAC instead of ADC)). Therefore, it will be understood by a person skilled in the art that various steps/operations or components with respect to a signal transmitting process may correspond to (e.g., in an opposite manner as explained above) various steps/operations or components of the signal receiving process as described hereinbefore according to various embodiments, and thus such corresponding steps/operations or components need not be repeated with respect to the signal transmitting process for clarity and conciseness, and are within the scope of the present invention. In other words, various embodiments described herein in context of the signal receiving process are analogously valid for the signal transmitting process.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present inventions will be described hereinafter by way of examples only and not limitations. It will be appreciated by a person skilled in the art that the present invention may, however, be embodied in various different forms and should not be construed as limited to the example embodiments set forth hereinafter. Rather, these example embodiments are provided so that this disclosure will be thorough and complete, and will fully convey the scope of the present invention to those skilled in the art.

Figure 10:
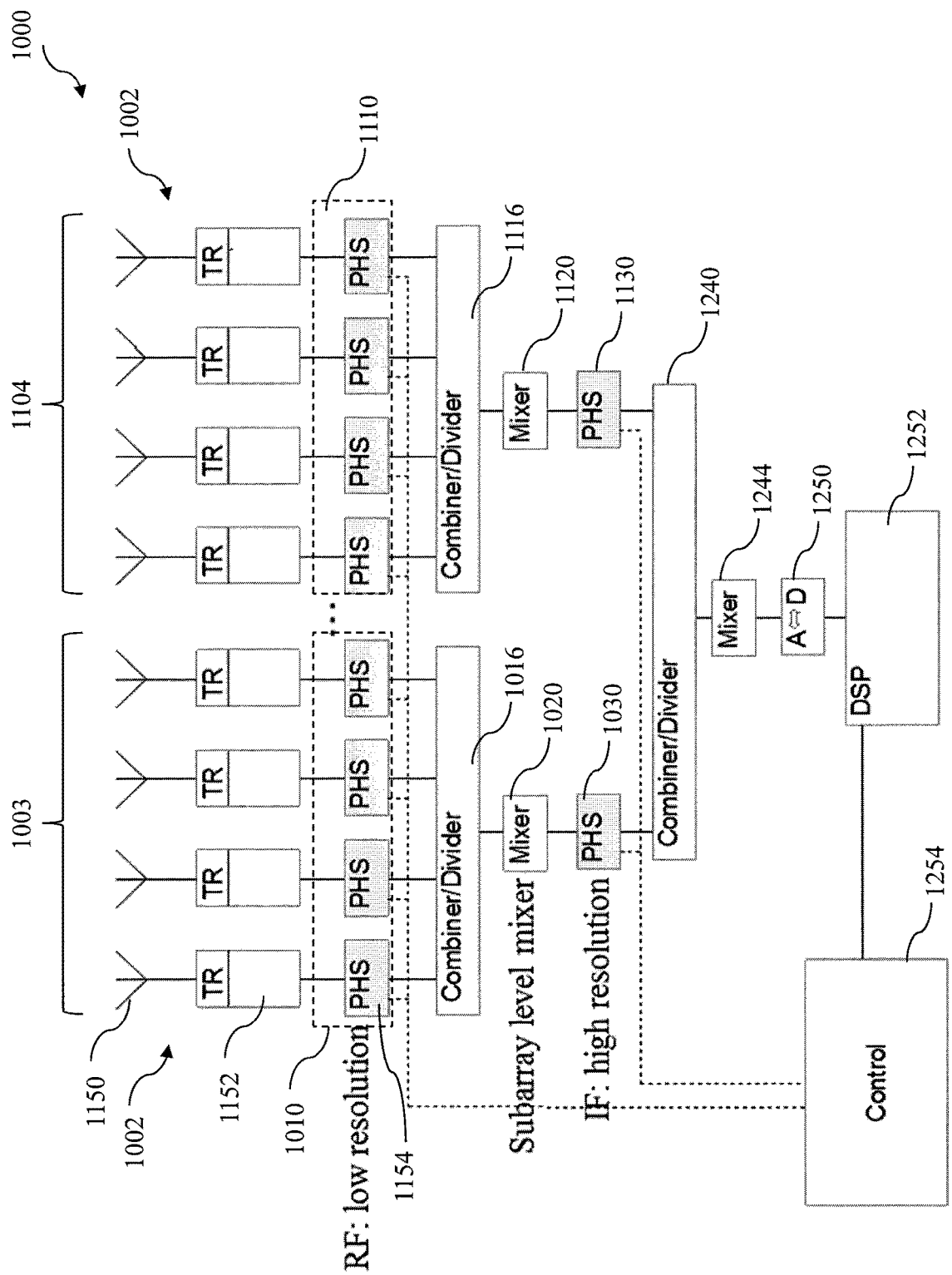
FIG. 10 depicts a schematic drawing of a beam steerable antenna system, according to various example embodiments of the present invention.

FIG. 10 depicts a schematic drawing of a beam steerable antenna system 1000 according to various example embodiments of the present invention. The system 1000 comprises an antenna array 1002 configured into a plurality of antenna subarrays. The plurality of antenna subarrays comprises a first antenna subarray 1003 (e.g., corresponding to the "first antenna subarray" as described hereinbefore according to various embodiments), including a plurality of first radiating elements and a second antenna subarray 1104 (e.g., corresponding to the "remaining antenna subarray" as described hereinbefore according to various embodiments), including a plurality of second radiating elements. The system 1000 further comprises a first phase control section 1010 coupled to the plurality of first radiating elements, the first phase control section 1010 being configured to control a phase of signals from the plurality of first radiating elements to output first phase controlled signals; a first combiner 1016 coupled to the first phase control section 1010, the first combiner 1016 (e.g., in the form of a RF power combiner) being configured to combine the first phase controlled signals to output a first combined signal; a first frequency converter 1020 (e.g., in the form of a frequency mixer) coupled to the first combiner 1024, the first frequency converter 1020 being configured to downconvert a frequency of the first combined signal to output a first downconverted signal; and a second phase control section 1030 coupled to the first frequency converter 1020, the second phase control section 1030 being configured to control a phase of the first downconverted signal to output a second phase controlled signal.

As shown in FIG. 10, the system 1000 may further comprise, for the second antenna subarray 1104 (e.g., corresponding to the "remaining antenna subarray" as described hereinbefore according to various embodiments): a third phase control section 1110 coupled to the second antenna subarray 1104, the third phase control section 1110 being configured to control a phase of signals from the plurality of second radiating elements of the second antenna subarray 1104 to output third phase controlled signals; a second combiner 1116 (e.g., in the form of a RF power combiner) coupled to the third phase control section 1110, the second combiner 1116 being configured to combine the third phase controlled signals to output a second combined signal; a second frequency converter (e.g., in the form of a frequency mixer) 1120 coupled to the second combiner 1116, the second frequency converter 1120 being configured to downconvert a frequency of the second combined signal to output a second downconverted signal; and a fourth phase control section 1130 coupled to the second frequency converter 1120, the fourth phase control section 1130 being configured to control a phase of the second downconverted signal to output a fourth phase controlled signal.

In various example embodiments, the third phase control section 1110, the second combiner 1116, the second frequency converter 1120 and the fourth phase control section are configured to operate or function is the same or similar manner as the first phase control section 1010, the first combiner 1016, the first frequency converter 1020 and the second phase control section 1030, respectively.

As shown in FIG. 10, the system 1000 may further comprise a third combiner 1240 (e.g., in the form of an IF power combiner) and a third frequency converter 1244. The third combiner 1240 is coupled to the second phase control section 1030 associated with the first antenna subarray 1003 and the fourth phase control section 1130 associated with the second antenna subarray 1104. The third combiner 1240 is configured to combine the second phase controlled signal output from the second phase control section 1030 associated with the first antenna subarray 1003 and the fourth phase controlled signal output from the fourth phase control section 1130 associated with the second antenna subarray 1104 to output a third combined signal. The third frequency converter 1244 is coupled to the third combiner 1240, and is configured to downconvert a frequency of the third combined signal to output a third downconverted signal.

As shown in FIG. 10, the system 1000 may further comprise an analog-to-digital converter (ADC) 1250 and a controller 1254. The analog-to-digital converter 1250 is coupled to the third frequency converter 1244, and is configured to convert the third downconverted signal (analog signal) to output a digital signal (e.g., based on sampling). As shown in FIG. 10, the analog-to-digital converter 1250 is arranged at a baseband domain of the system 1000. Accordingly, the third frequency converter 1244 may thus be configured to downconvert a signal received from IF to baseband. As shown in FIG. 10, the controller 1254 is coupled to the first phase control section 1010 and the second phase control section 1030 associated with the first antenna subarray 1003 and the third phase control section 1110 and the fourth phase control section 1130 associated with the second antenna subarray 1104. The controller 1254 is configured to control the first, second, third and fourth phase control sections (e.g., via a control or feedback signal) based on the digital signal converted by the analog-to-digital converter 1250. As shown in FIG. 10, the system 1000 may further comprise a digital signal processor 1252 configured to receive and process the digital signal converted by the analog-to-digital converter 1250 and output a processed signal to the controller 1254.

Accordingly, various example embodiments of the present invention provide a beam steerable antenna system, such as the system 1000 as shown in FIG. 10, having a multi-stage phase control at different frequency domains (e.g., different frequency stages or chains), which has been found to advantageously improve beam steering resolution (e.g., enable a high beam steering resolution) in an efficient, effective and/or practical manner. For example, in the beam steerable antenna system 1000, the first and third phase control sections 1010, 1110 are provided at a first frequency domain (e.g., RF) and are configured to control a phase of first signal(s) inputted thereto, and furthermore, the second and fourth phase control section 1030, 1130 are provided at a second frequency domain (e.g., IF) and are configured to control a phase of second signal(s) (derived from the first signal(s)) inputted thereto.

Accordingly, various example embodiments advantageously provide a hybrid antenna array for high frequencies.

Various example embodiments provide a beam steerable antenna system that seeks to avoid, or at least mitigate, various drawbacks/deficiencies associated with conventional beam steering antenna systems, such as described hereinbefore with reference to FIGS. 2 to 5. In this regard, various example embodiments provide improved beam scanning resolution by using a multi-stage phase control at different frequency domains or stages (e.g., a two-stage phase control at RF domain (or element level) and IF domain (or subarray level) is implemented according to the example beam steerable antenna system 1000 shown in FIG. 10) for both transmitting and receiving. With respect to the beam steerable antenna system 1000 shown in FIG. 10, for example, the element level phase control 1010/1110 has a low resolution while the subarray level phase control 1030/1130 is performed after the frequency mixer 1020/1120 and has a high resolution. Various example embodiments further enable a cost and power effective solution for large array with good scanning resolution.

According to various example embodiments, for example as shown in FIG. 10, architecture of an antenna array with a plurality of channels is provided. Each channel may include an antenna 1150, a TR module 1152 with a first stage RF phase shifter 1154 at the system operation frequency. A plurality of channels may be considered or arranged as one antenna subarray 1003/1104 where the RF signals are distributed or combined using a power divider 1016/1116. In various example embodiments, the number of channels in each antenna subarray 1003/1104 may be the same or may be different.

As shown in FIG. 10, each antenna subarray 1003/1104 is connected to a frequency mixer 1020/1120 and an IF phase shifter 1030/1130. In various example embodiments, amplitude control may be performed at the RF or IF stage or both with different resolution. The IF signals output from the IF phase shifter 1030/1130 may then be distributed or combined using IF power dividers 1240.

In various example embodiments, the first stage RF phase control section 1010/1110 includes phase shifters configured to provide coarse phase shifts (first stage RF phase shift), e.g., with 1 to 5 bits (phase resolution ranges from 180° to 11.25°). Accordingly, the first stage RF phase control section 1010/1110 may be configured to provide coarse beam steering resolution. By way of an example only and without limitation, the first stage RF phase control section 1010/1110 may control a subarray of 2 to 8 radiating elements in linear lattice and 4 to 64 elements in planar lattice.

After the frequency mixer 1020/1120, a high resolution phase control section 1030/1130 may be provided to implement IF stage beam steering (second stage IF phase shift). The IF phase control section 1030/1130 may be configured to produce fine phase shifts, e.g., with 3 to 13 bits. For example, the second stage IF phase shift may include some of the coarse phase steps of the first stage RF phase shift, and may also provide the complementary bits. By way of example only and without limitations, the RF phase shifter provides the following phase shift steps: 180°, 90°, 45°, then IF phase shifter's finest phase shift includes 1.40625°, 2.8125°, 5.625°, 11.25°, 22.5°, and can include or exclude the steps in the RF phase shifter: 180°, 90°, 45°.

For example, for very large phased array where thousands of radiating elements are used, the IF level distribution significantly reduces the distribution loss since the RF distribution loss is not a simple linear function of the number of elements. As a result, the power efficiency of the whole array can be improved. Thereafter, the IF signals are digitized using one or a number ADC/DAC, which is significantly less than the number of subarrays.

For example, the overall phase changes experienced by an antenna may be determined by the sum of both RF and IF phase shift values. A high resolution RF alone, in conventional system, may be sufficient but loss is too high. However, a lower-resolution RF phase shifter and higher-resolution IF phase shifter improves overall scan resolution in an power efficient way according to various example embodiments of the present invention. In various example embodiments, the DSP 1252 may be configured to determine the phase shifter values for both RF and IF phase shifters, based on certain objective functions, and the controller 1254 may be configured to execute the phase changes in both RF and IF phase shifters.

In various example embodiments, a narrow bandwidth (narrowband) or a broad bandwidth (broadband) IF phase shifter 1030/1130 may be implemented. For example, RF phase shifter may be lossy, and IF phase shifter has less loss. Accordingly, various example embodiments may reduce some phase control in RF say from 4 bits to 2 bits and add some phase control in IF. Thus, various applications are not necessarily directed to a broadband system.

Figure 11:
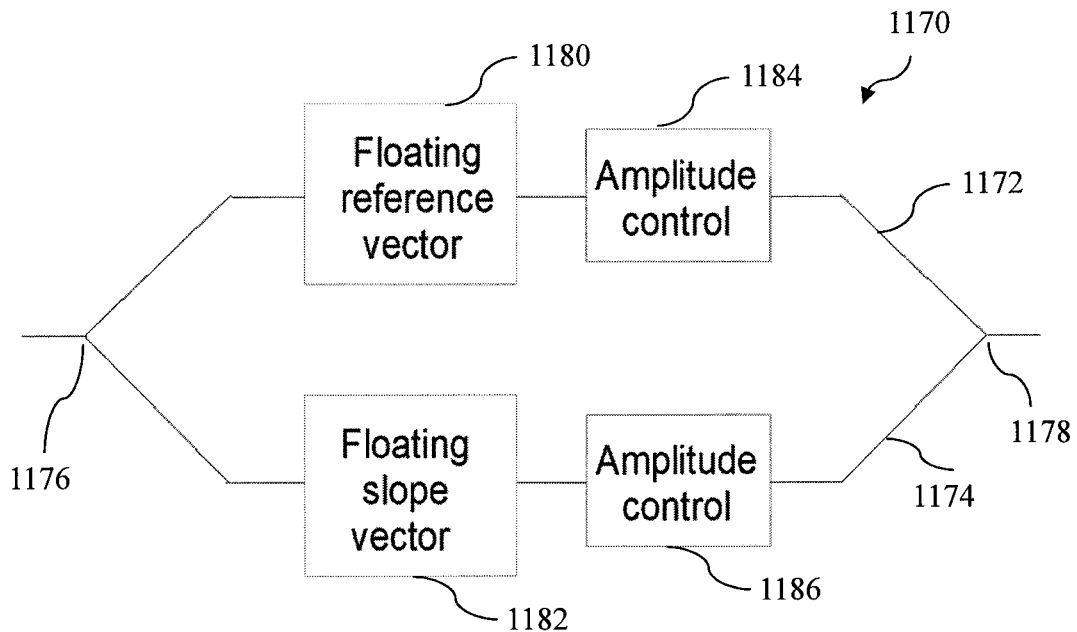
FIG. 11 depicts a schematic drawing of a broadband phase shifter, according to various example embodiments of the present invention.

FIG. 11 depicts a schematic drawing of a broadband phase shifter 1170 according to various example embodiments of the present invention, which advantageously reduces the squint effect. In particular, the broadband phase shifter 1170 is configured to generate a variable (or non-constant) phase shift. As shown in FIG. 11, the broadband phase shifter 1170 may comprise a first branch 1172 and a second branch 1174 connected at input ends 1176 thereof and at output ends 1178 thereof. The first branch 1172 comprises a first component 1180 configured to generate a first phase shift with a first slope profile and the second branch 1174 comprises a second component 1182 configured to generate a second phase shift with a second slope profile. In particular, the first slope profile and the second slope profile are different.

Accordingly, based on the example configuration of the broadband phase shifter 1170 as shown in FIG. 11, a non-constant phase shift may be generated by two different branches 1180, 1182. In various example embodiments, the two branches 1180, 1182 may be a combination of active or passive all-pass network, high-pass network, low-pass network or band-pass network, such as a combination of high-pass and low-pass or a combination of high-pass and all-pass. For example, the branches 1180, 1182 may include components such as varactors or switches that can be configured (e.g., tuned) to provide different non-constant phase shift with different slopes and different references.

In various example embodiments, the tuning may be defined as floating vectors since the generated vectors are not fixed. For example, the first component 1180 may be configured as a floating reference vector (for example and without limitation, for the tunable high-pass or low-pass networks, the insertion phase of each network may be changed by changing the tunable capacitors or inductors) and the second component 1182 may be configured as a floating slop vector (for example and without limitation, using resonator based networks or all-pass networks, and for all-pass networks, the transition frequency may be adjusted to obtain different phase slops). The two floating vectors 1180, 1182 may then be connected to a respective amplitude control device 1184, 1186 (e.g., including attenuators and/or variable gain amplifiers) to implement vector summation as constant vectors. The obtained vector (vector summation) has a non-constant phase response which has been found to advantageously provide reduced or smaller squint for high resolution scanning. For example, assuming the phase difference generated by the two floating vectors 1180, 1182, at fmin and fmax, the phase difference of the vector is φ. For an ideal phase shifter with constant phase shifts (e.g., I and Q), φ=0. For TTD, φ is a linear function of frequency to cancel the squint effect. For the summation case, assume that the amplitude ratio between the two vectors is w, the combined phase response may thus generate a φ' between φ and 0, thus improve the squint effect. For example, FIG. 12 depicts a graph showing an example phase response of the broadband phase shifter 1170.

Figure 12:
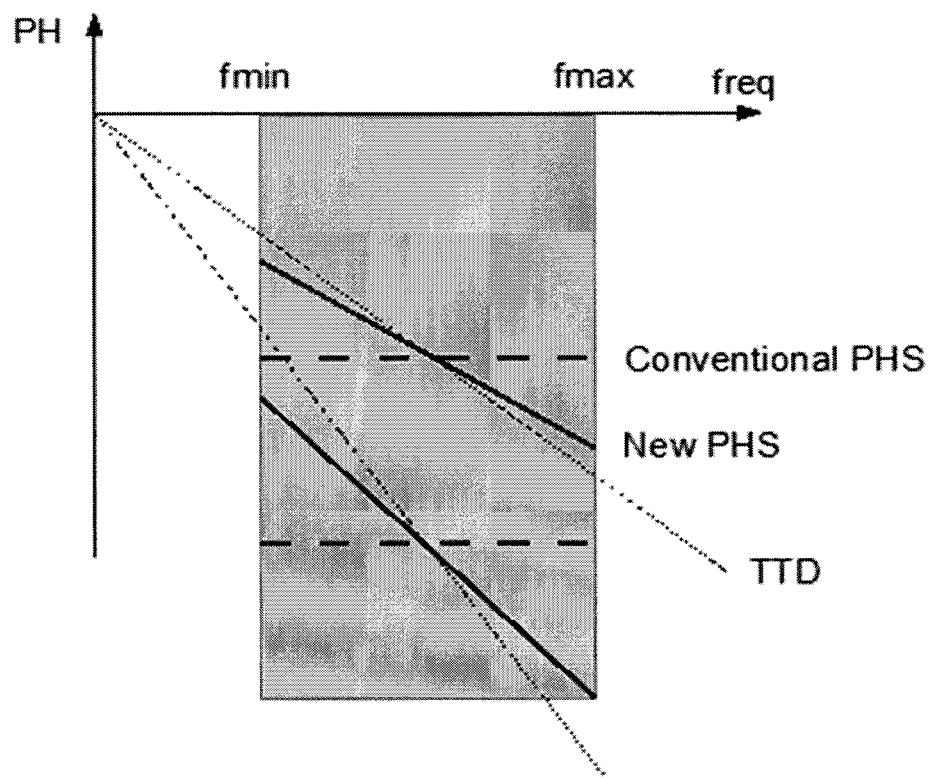
FIG. 12 depicts a graph showing an example phase response of the broadband phase shifter, according to various example embodiments of the present invention.

Accordingly, as can be seen from FIG. 12, for a broadband IF phase shifter, tunable vectors may be used to generate non-constant phase shifts with different slopes. Small steps may then be achieved by non-constant vector summation instead of cascading for less power consumption. For example, the two vectors has a phase difference of 10° at low frequency and 50° at high frequency with the purpose of squint reduction, then for a certain weights of the two vectors, the combined phase shift will have 2° (i.e., ⅕ of 10°) at the low frequency and about 10° (i.e., ⅕ of 50°, depending on how flat the response is) at the high frequency.

Figure 13A:
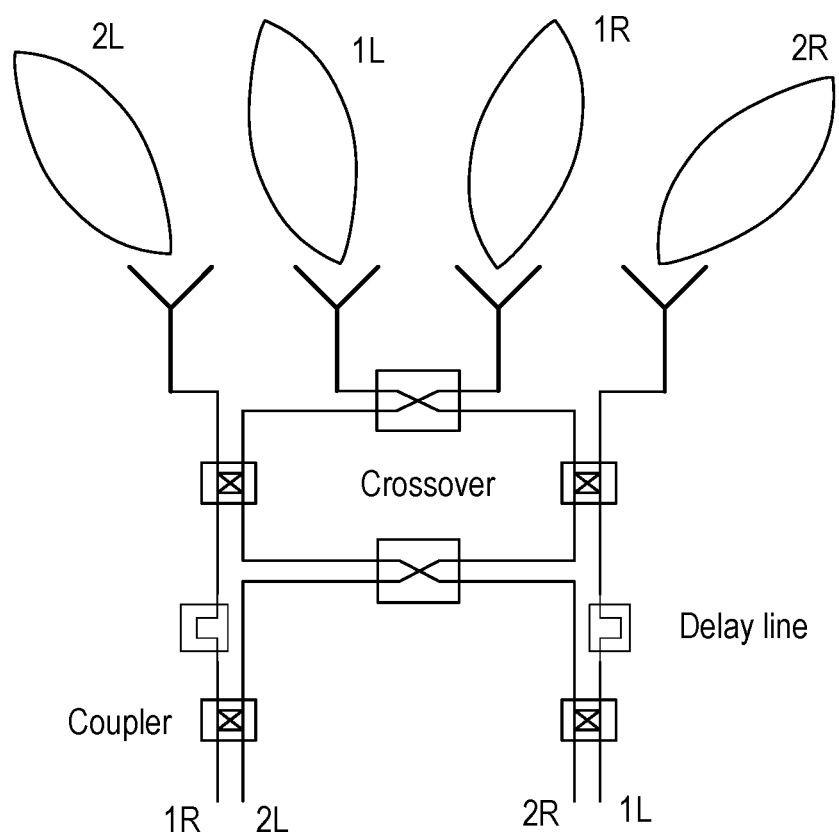
FIGS. 13A, 13B and 13C show three example other types of antenna arrangements/configurations which may also be employed, according to various example embodiments of the present invention.
Figure 13B:
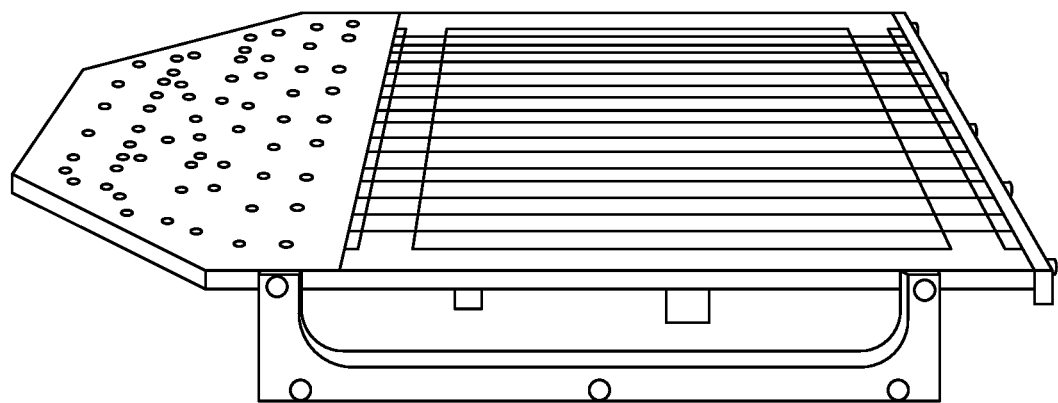
Figure 13C:
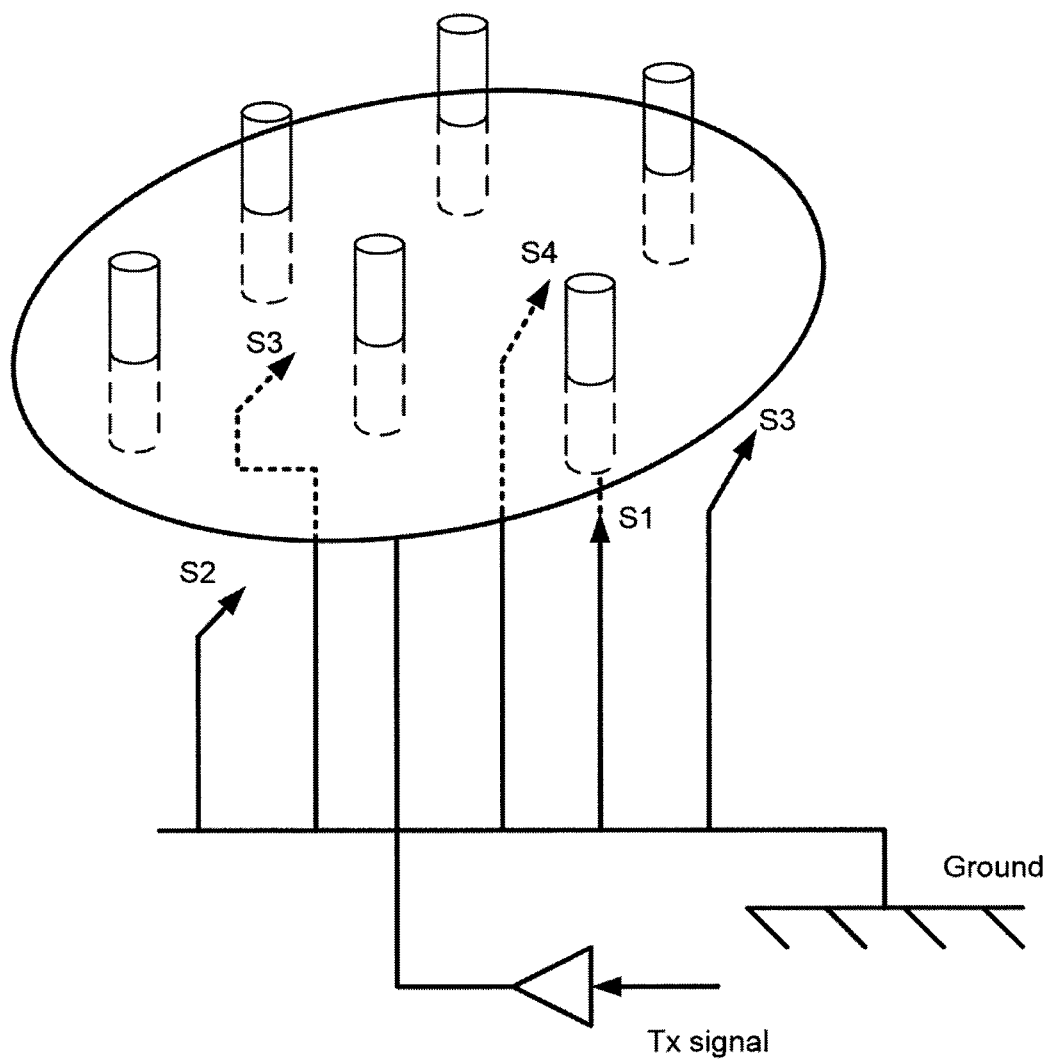

Although various example embodiments of the present invention have been described with respect to a subarray based antenna (e.g., antenna subarrays 1003, 1104 shown in FIG. 10), it will be appreciated that the present invention is not limited to such a subarray based antenna (e.g., the multi-stage phase control as described herein according to various embodiments is not limited to being implemented with respect to a subarray based antenna) and may be replaced by other types of antenna arrangements/configurations, such as but not limited to, switched beam antennas as shown in FIG. 13A or other self-steerable antennas with less scanning resolution, such as a leaky wave beam steering antenna (e.g., small size Kymeta) as shown in FIG. 13B or a parasitic antenna as shown in FIG. 13C. For example, the antenna and coarse tuned RF phase shifters associated with the subarray based antenna may be replaced by other types of antenna arrangements/configurations. For example, when these antennas are further clustered as larger array with narrower beam, fine control of the beam is possible by adding IF level fine tune phase shifters.

Figure 14:
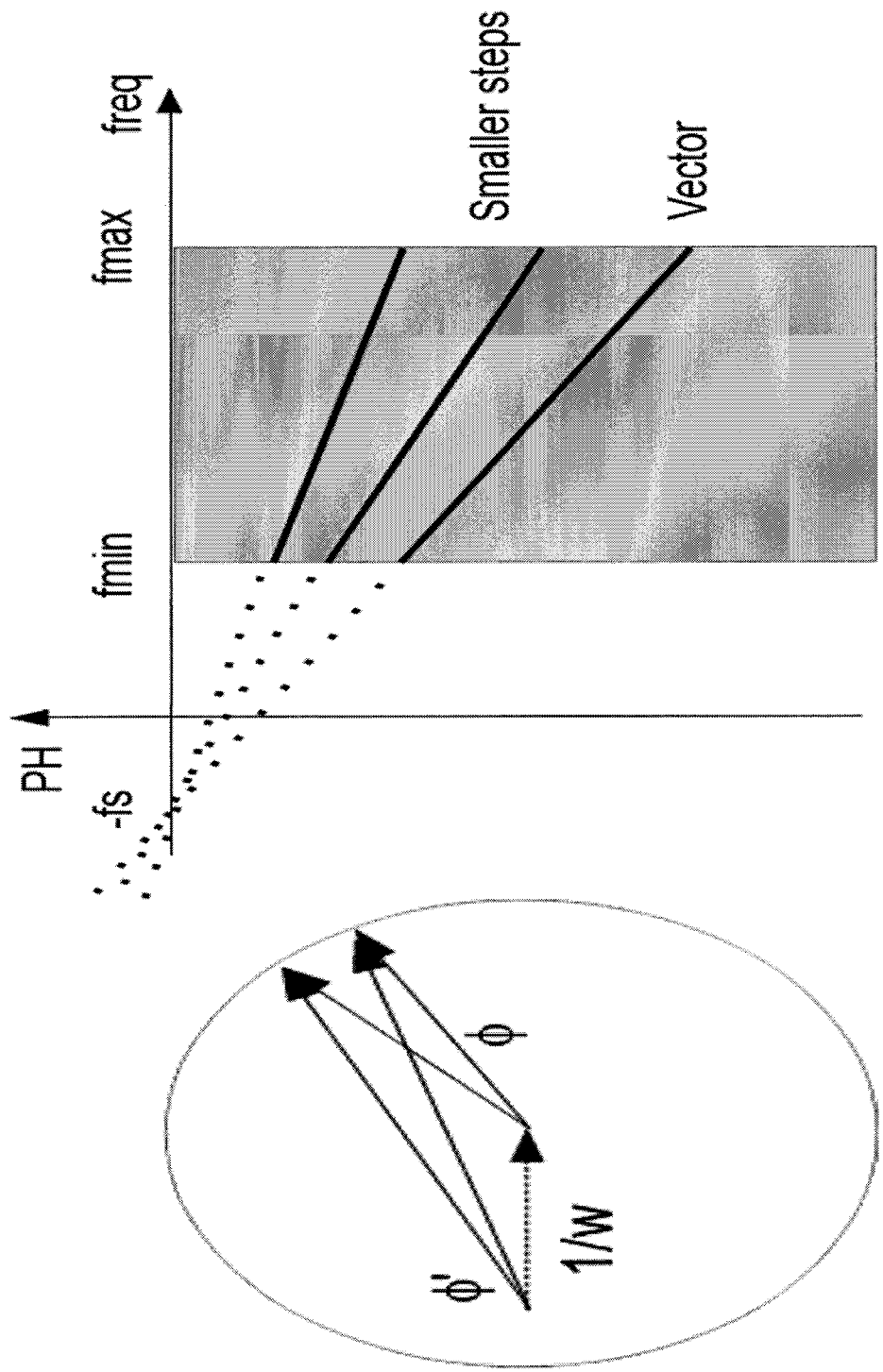
FIG. 14 illustrates an example of the vector sum method for a broadband phase shifter to minimise the squint effect, according to various example embodiments of the present invention.

Accordingly, various embodiments of the present invention provide an antenna architecture or configuration, where the accurate phase control is achieved in multiple stages (e.g., two stages). For example, for a two-stage phase control, the second stage is implemented at a lower frequency than the first stage to obtain improved resolution (e.g., high resolution). Furthermore, in various embodiments for broadband applications with squinting problems, a non-constant phase shift solution is provided using floating vectors and a vector sum method to avoid cascaded structure. For example, FIG. 14 illustrates an example of the vector sum method for a broadband phase shifter to minimise the squint effect.

Accordingly, various embodiments of the present invention provide a beam steerable antenna system and associated/related methods having a number of advantages or technical effects, such as but not limited to, high beam steering resolution, low power consumption, minimum ADC, low loss signal distribution at IF stage and simplified control circuits.

While embodiments of the present invention have been particularly shown and described with reference to specific embodiments, it should be understood by those skilled in the art that various changes in form and detail may be made therein without departing from the scope of the present invention as defined by the appended claims. The scope of the present invention is thus indicated by the appended claims and all changes which come within the meaning and range of equivalency of the claims are therefore intended to be embraced.

What is claimed is:

1. A beam steerable antenna system comprising:
an antenna array comprising a plurality of first radiating elements;
a first phase control section coupled to the plurality of first radiating elements, the first phase control section being configured to control a phase of signals from the plurality of first radiating elements to output first phase controlled signals;
a first combiner coupled to the first phase control section, the first combiner being configured to combine the first phase controlled signals to output a first combined signal;

a first frequency converter coupled to the first combiner, the first frequency converter being configured to downconvert a frequency of the first combined signal to output a first downconverted signal; and a second phase control section coupled to the first frequency converter, the second phase control section being configured to control a phase of the first downconverted signal to output a second phase controlled signal, wherein the antenna array is configured into a plurality of antenna subarrays, a first antenna subarray of the plurality of antenna subarrays comprises the plurality of first radiating elements, and each remaining antenna subarray of the plurality of antenna subarrays comprises a plurality of second radiating elements, and the beam steerable antenna system further comprises, for said each remaining antenna subarray:

a third phase control section coupled to the remaining antenna subarray, the third phase control section being configured to control a phase of signals from the plurality of second radiating elements of the remaining antenna subarray to output third phase controlled signals;

a second combiner coupled to the third phase control section, the second combiner being configured to combine the third phase controlled signals to output a second combined signal;

a second frequency converter coupled to the second combiner, the second frequency converter being configured to downconvert a frequency of the second combined signal to output a second downconverted signal; and a fourth phase control section coupled to the second frequency converter, the fourth phase control section being configured to control a phase of the second downconverted signal to output a fourth phase controlled signal.

2. The beam steerable antenna system according to claim 1, wherein the first phase control section comprises a plurality of first phase shifters and is arranged at a radio frequency (RF) domain of the beam steerable antenna system.

3. The beam steerable antenna system according to claim 2, wherein each of the plurality of first phase shifters is coupled to a respective radiating element of the plurality of first radiating elements at an input portion thereof and is coupled to the first combiner at an output portion thereof.

4. The beam steerable antenna system according to claim 1, wherein the second phase control section comprises a second phase shifter and is arranged at an intermediate frequency (IF) domain of the beam steerable antenna system, and the second phase shifter is coupled to the first frequency converter at an input portion thereof.

5. The beam steerable antenna system according to claim 4, wherein the second phase shifter is a broadband phase shifter configured to generate a variable phase shift.

6. The beam steerable antenna system according to claim 5, wherein the broadband phase shifter comprises a first branch and a second branch connected at input ends thereof and at output ends thereof, the first branch comprises a first component configured to generate a first phase shift with a first slope profile and the second branch comprises a second component configured to generate a second phase shift with a second slope profile, wherein the first slope profile and the second slope profile are different.

7. The beam steerable antenna system according to claim 1, further comprising a third combiner and a third frequency converter, wherein the third combiner is coupled to the second phase control section associated with the first antenna subarray and the fourth phase control section associated with said each remaining antenna subarray, the third combiner being configured to combine the second phase controlled signal output from the second phase control section associated with the first antenna subarray and the fourth phase controlled signal output from the fourth phase control section associated with said each remaining antenna subarray to output a third combined signal, and the third frequency converter is coupled to the third combiner, the third frequency converter being configured to downconvert a frequency of the third combined signal to output a third downconverted signal.

8. The beam steerable antenna system according to claim 7, further comprising an analog/digital converter and a controller, wherein the analog/digital converter is coupled to the third frequency converter, the analog/digital converter being configured to convert the third downconverted signal to output a digital signal and is arranged at a baseband domain of the beam steerable antenna system, and the controller is coupled to the first phase control section and the second phase control section associated with the first antenna subarray and the third phase control section and the fourth phase control section associated with said each remaining antenna subarray, the controller being configured to control the first phase control section and the second phase control section associated with the first antenna subarray and the third phase control section and the fourth phase control section associated with said each remaining antenna subarray based on the digital signal.

9. A method of manufacturing a beam steerable antenna system, the method comprising:

forming an antenna array comprising a plurality of first radiating elements;

coupling a first phase control section to the plurality of first radiating elements, the first phase control section being configured to control a phase of signals from the plurality of first radiating elements to output first phase controlled signals;

coupling a first combiner to the first phase control section, the first combiner being configured to combine the first phase controlled signals to output a first combined signal;

coupling a first frequency converter to the first combiner, the first frequency converter being configured to downconvert a frequency of the first combined signal to output a first downconverted signal; and coupling a second phase control section to the first frequency converter, the second phase control section being configured to control a phase of the first downconverted signal to output a second phase controlled signal, wherein the antenna array is configured into a plurality of antenna subarrays, a first antenna subarray of the plurality of antenna subarrays comprises the plurality of first radiating elements, and each remaining antenna subarray of the plurality of antenna subarrays comprises a plurality of second radiating elements, and the method further comprises, for said each remaining antenna subarray:
- coupling a third phase control section to the remaining antenna subarray, the third phase control section being configured to control a phase of signals from the plurality of second radiating elements of the remaining antenna subarray to output third phase controlled signals;
- coupling a second combiner to the third phase control section, the second combiner being configured to combine the third phase controlled signals to output a second combined signal;
- coupling a second frequency converter to the second combiner, the second frequency converter being configured to downconvert a frequency of the second combined signal to output a second downconverted signal; and
- coupling a fourth phase control section to the second frequency converter, the fourth phase control section being configured to control a phase of the second downconverted signal to output a fourth phase controlled signal.

10. The method according to claim 9, wherein the first phase control section comprises a plurality of first phase shifters and is arranged at a radio frequency (RF) domain of the beam steerable antenna system.

11. The method according to claim 10, wherein each of the plurality of first phase shifters is coupled to a respective radiating element of the plurality of first radiating elements at an input portion thereof and is coupled to the first combiner at an output portion thereof.

12. The method according to claim 9, wherein
the second phase control section comprises a second phase shifter and is arranged at an intermediate frequency (IF) domain of the beam steerable antenna system, and
the second phase shifter is coupled to the first frequency converter at an input portion thereof.

13. The method according to claim 12, wherein the second phase shifter is a broadband phase shifter configured to generate a variable phase shift.

14. The method according to claim 13, wherein the broadband phase shifter comprises a first branch and a second branch connected at input ends thereof and at output ends thereof, the first branch comprises a first component configured to generate a first phase shift with a first slope profile and the second branch comprises a second component configured to generate a second phase shift with a second slope profile, wherein the first slope profile and the second slope profile are different.

15. The method according to claim 9, further comprising:
coupling a third combiner to the second phase control section associated with the first antenna subarray and the fourth phase control section associated with said each remaining antenna subarray, the third combiner being configured to combine the second phase controlled signal output from the second phase control section associated with the first antenna subarray and the fourth phase controlled signal output from the fourth phase control section associated with said each remaining antenna subarray to output a third combined signal, and
coupling a third frequency converter to the third combiner, the third frequency converter being configured to downconvert a frequency of the third combined signal to output a third downconverted signal.

16. The method according to claim 15, further comprising:
coupling an analog/digital converter to the third frequency converter, the analog/digital converter being configured to convert the third downconverted signal to output a digital signal and is arranged at a baseband domain of the beam steerable antenna system, and
coupling a controller to the first phase control section and the second phase control section associated with the first antenna subarray and the third phase control section and the fourth phase control section associated with said each remaining antenna subarray, the controller being configured to control the first phase control section and the second phase control section associated with the first antenna subarray and the third phase control section and the fourth phase control section associated with said each remaining antenna subarray based on the digital signal.

17. A method of beam steering an antenna array comprising a plurality of first radiating elements, the method comprising:
controlling, at a first phase control section coupled to the plurality of first radiating elements, a phase of signals from the plurality of first radiating elements to output first phase controlled signals;
combining, at a first combiner coupled to the first phase control section, the first phase controlled signals to output a first combined signal;
downconverting, at a first frequency converter coupled to the first combiner, a frequency of the first combined signal to output a first downconverted signal; and
controlling, at a second phase control section coupled to the first frequency converter, a phase of the first downconverted signal to output a second phase controlled signal, wherein
the antenna array is configured into a plurality of antenna subarrays,
a first antenna subarray of the plurality of antenna subarrays comprises the plurality of first radiating elements, and each remaining antenna subarray of the plurality of antenna subarrays comprises a plurality of second radiating elements, and
for said each remaining antenna subarray:
controlling, at a third phase control section coupled to the remaining antenna subarray, a phase of signals from the plurality of second radiating elements of the remaining antenna subarray to output third phase controlled signals;
combining, at a second combiner coupled to the third phase control section, the third phase controlled signals to output a second combined signal;
downconverting, at a second frequency converter coupled to the second combiner, a frequency of the second combined signal to output a second downconverted signal; and
controlling, a fourth phase control section coupled to the second frequency converter, a phase of the second downconverted signal to output a fourth phase controlled signal.

18. The method according to claim 17, wherein
the first phase control section comprises a plurality of first phase shifters and is arranged at a radio frequency (RF) domain of the beam steerable antenna system, the second phase control section comprises a second phase shifter and is arranged at an intermediate frequency (IF) domain of the beam steerable antenna system, and the second phase shifter is coupled to the first frequency converter at an input portion thereof.

\* \* \* \* \*